US011080556B1

(12) United States Patent
Gillian et al.

(10) Patent No.: US 11,080,556 B1
(45) Date of Patent: Aug. 3, 2021

(54) USER-CUSTOMIZABLE MACHINE-LEARNING IN RADAR-BASED GESTURE DETECTION

(71) Applicant: Google Inc., Mountain View, CA (US)

(72) Inventors: Nicholas Edward Gillian, Palo Alto, CA (US); Jaime Lien, Mountain View, CA (US); Patrick M. Amihood, San Francisco, CA (US); Ivan Poupyrev, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 736 days.

(21) Appl. No.: 15/287,359

(22) Filed: Oct. 6, 2016

Related U.S. Application Data

(60) Provisional application No. 62/237,975, filed on Oct. 6, 2015.

(51) Int. Cl.
*G06K 9/62* (2006.01)
*G06F 3/01* (2006.01)
*G06K 9/00* (2006.01)

(52) U.S. Cl.
CPC ........... *G06K 9/6254* (2013.01); *G06F 3/017* (2013.01); *G06K 9/00355* (2013.01); *G06K 9/6255* (2013.01); *G06K 9/6262* (2013.01)

(58) Field of Classification Search
None
See application file for complete search history.

(56) References Cited

U.S. PATENT DOCUMENTS

| 3,610,874 | A | 10/1971 | Gagliano |
| 3,953,706 | A | 4/1976 | Harris et al. |
| 4,654,967 | A | 4/1987 | Thenner |
| 4,700,044 | A | 10/1987 | Hokanson et al. |
| 4,795,998 | A | 1/1989 | Dunbar et al. |

(Continued)

FOREIGN PATENT DOCUMENTS

| CN | 101636711 | 1/2010 |
| CN | 202887794 | 4/2013 |

(Continued)

OTHER PUBLICATIONS

"Combined Search and Examination Report", GB Application No. 1620892.8, dated Apr. 6, 2017, 5 pages.

(Continued)

*Primary Examiner* — Andre L Matthews
(74) *Attorney, Agent, or Firm* — Colby Nipper PLLC

(57) ABSTRACT

Various embodiments dynamically learn user-customizable input gestures. A user can transition a radar-based gesture detection system into a gesture-learning mode. In turn, the radar-based gesture detection system emits a radar field configured to detect a gesture new to the radar-based gesture detection system. The radar-based gesture detection system receives incoming radio frequency (RF) signals generated by the outgoing RF signal reflecting off the gesture, and analyzes the incoming RF signals to learn one or more identifying characteristics about the gesture. Upon learning the identifying characteristics, the radar-based gesture detection system reconfigures a corresponding input identification system to detect the gesture when the one or more identifying characteristics are next identified, and transitions out of the gesture-learning mode.

21 Claims, 9 Drawing Sheets

(56) References Cited

U.S. PATENT DOCUMENTS

| | | | |
|---|---|---|---|
| 4,838,797 A | 6/1989 | Dodier | |
| 5,298,715 A | 3/1994 | Chalco et al. | |
| 5,341,979 A | 8/1994 | Gupta | |
| 5,468,917 A | 11/1995 | Brodsky et al. | |
| 5,564,571 A | 10/1996 | Zanotti | |
| 5,656,798 A | 8/1997 | Kubo et al. | |
| 5,724,707 A | 3/1998 | Kirk et al. | |
| 5,798,798 A | 8/1998 | Rector et al. | |
| 6,032,450 A | 3/2000 | Blum | |
| 6,080,690 A | 6/2000 | Lebby et al. | |
| 6,210,771 B1 | 4/2001 | Post et al. | |
| 6,313,825 B1 | 11/2001 | Gilbert | |
| 6,340,979 B1 | 1/2002 | Beaton et al. | |
| 6,386,757 B1 | 5/2002 | Konno | |
| 6,440,593 B2 | 8/2002 | Ellison et al. | |
| 6,492,980 B2 | 12/2002 | Sandbach | |
| 6,493,933 B1 | 12/2002 | Post et al. | |
| 6,513,833 B2 | 2/2003 | Breed et al. | |
| 6,513,970 B1 | 2/2003 | Tabata et al. | |
| 6,543,668 B1 | 4/2003 | Fujii et al. | |
| 6,711,354 B2 | 3/2004 | Kameyama | |
| 6,717,065 B2 | 4/2004 | Hosaka et al. | |
| 6,802,720 B2 | 10/2004 | Weiss et al. | |
| 6,833,807 B2 | 12/2004 | Flacke et al. | |
| 6,835,898 B2 | 12/2004 | Eldridge et al. | |
| 6,854,985 B1 | 2/2005 | Weiss | |
| 6,929,484 B2 | 8/2005 | Weiss et al. | |
| 7,134,879 B2 | 11/2006 | Sugimoto et al. | |
| 7,164,820 B2 | 1/2007 | Eves et al. | |
| 7,223,105 B2 | 5/2007 | Weiss et al. | |
| 7,249,954 B2 | 7/2007 | Weiss | |
| 7,299,964 B2 | 11/2007 | Jayaraman et al. | |
| 7,310,236 B2 | 12/2007 | Takahashi et al. | |
| 7,317,416 B2 | 1/2008 | Flom et al. | |
| 7,348,285 B2 | 3/2008 | Dhawan et al. | |
| 7,365,031 B2 | 4/2008 | Swallow et al. | |
| 7,421,061 B2 | 9/2008 | Boese et al. | |
| 7,462,035 B2 | 12/2008 | Lee et al. | |
| 7,528,082 B2 | 5/2009 | Krans et al. | |
| 7,544,627 B2 | 6/2009 | Tao et al. | |
| 7,578,195 B2 | 8/2009 | DeAngelis et al. | |
| 7,644,488 B2 | 1/2010 | Aisenbrey | |
| 7,670,144 B2 | 3/2010 | Ito et al. | |
| 7,677,729 B2 | 3/2010 | Vilser et al. | |
| 7,691,067 B2 | 4/2010 | Westbrook et al. | |
| 7,698,154 B2 | 4/2010 | Marchosky | |
| 7,791,700 B2 | 9/2010 | Bellamy | |
| 7,834,276 B2 | 11/2010 | Chou et al. | |
| 7,952,512 B1 | 5/2011 | Delker et al. | |
| 8,062,220 B2 | 11/2011 | Kurtz et al. | |
| 8,169,404 B1 | 5/2012 | Boillot | |
| 8,179,604 B1 | 5/2012 | Prada Gomez et al. | |
| 8,282,232 B2 | 10/2012 | Hsu et al. | |
| 8,289,185 B2 | 10/2012 | Alonso | |
| 8,301,232 B2 | 10/2012 | Albert et al. | |
| 8,334,226 B2 | 12/2012 | Nhan et al. | |
| 8,341,762 B2 | 1/2013 | Balzano | |
| 8,367,942 B2 | 2/2013 | Howell et al. | |
| 8,475,367 B1 | 7/2013 | Yuen et al. | |
| 8,505,474 B2 | 8/2013 | Kang et al. | |
| 8,527,146 B1 | 9/2013 | Jackson et al. | |
| 8,549,829 B2 | 10/2013 | Song et al. | |
| 8,560,972 B2 | 10/2013 | Wilson | |
| 8,569,189 B2 | 10/2013 | Bhattacharya et al. | |
| 8,614,689 B2 | 12/2013 | Nishikawa et al. | |
| 8,700,137 B2 | 4/2014 | Albert | |
| 8,758,020 B2 | 6/2014 | Burdea et al. | |
| 8,759,713 B2 | 6/2014 | Sheats | |
| 8,764,651 B2 | 7/2014 | Tran | |
| 8,785,778 B2 | 7/2014 | Streeter et al. | |
| 8,790,257 B2 | 7/2014 | Libbus et al. | |
| 8,814,574 B2 | 8/2014 | Selby et al. | |
| 9,055,879 B2 | 6/2015 | Selby et al. | |
| 9,093,289 B2 | 7/2015 | Vicard et al. | |
| 9,125,456 B2 | 9/2015 | Chow | |
| 9,141,194 B1 | 9/2015 | Keyes et al. | |
| 9,148,949 B2 | 9/2015 | Zhou et al. | |
| 9,230,160 B1 | 1/2016 | Kanter | |
| 9,331,422 B2 | 5/2016 | Nazzaro et al. | |
| 9,335,825 B2 | 5/2016 | Rautiainen et al. | |
| 9,575,560 B2 | 2/2017 | Poupyrev et al. | |
| 9,588,625 B2 | 3/2017 | Poupyrev | |
| 9,594,443 B2 | 3/2017 | Vanblon et al. | |
| 9,600,080 B2 | 3/2017 | Poupyrev | |
| 9,693,592 B2 | 7/2017 | Robinson et al. | |
| 9,746,551 B2 | 8/2017 | Scholten et al. | |
| 9,778,749 B2 | 10/2017 | Poupyrev | |
| 9,811,164 B2 | 11/2017 | Poupyrev | |
| 9,817,109 B2 * | 11/2017 | Saboo .................. G01S 13/584 |
| 9,837,760 B2 | 12/2017 | Karagozler et al. | |
| 9,921,660 B2 | 3/2018 | Poupyrev | |
| 9,933,908 B2 | 4/2018 | Poupyrev | |
| 10,063,427 B1 | 8/2018 | Brown | |
| 10,222,469 B1 | 3/2019 | Gillian et al. | |
| 10,300,370 B1 | 5/2019 | Amihood et al. | |
| 10,310,621 B1 | 6/2019 | Lien et al. | |
| 10,379,621 B2 | 8/2019 | Schwesig et al. | |
| 10,401,490 B2 | 9/2019 | Gillian et al. | |
| 10,459,080 B1 | 10/2019 | Schwesig et al. | |
| 10,503,883 B1 | 12/2019 | Gillian et al. | |
| 10,509,478 B2 | 12/2019 | Poupyrev et al. | |
| 10,540,001 B1 | 1/2020 | Poupyrev et al. | |
| 10,572,027 B2 | 2/2020 | Poupyrev et al. | |
| 10,579,150 B2 | 3/2020 | Gu et al. | |
| 10,642,367 B2 | 5/2020 | Poupyrev | |
| 10,664,059 B2 | 5/2020 | Poupyrev | |
| 10,664,061 B2 | 5/2020 | Poupyrev | |
| 10,705,185 B1 | 7/2020 | Lien et al. | |
| 10,768,712 B2 | 9/2020 | Schwesig et al. | |
| 10,817,065 B1 | 10/2020 | Lien et al. | |
| 10,817,070 B2 | 10/2020 | Lien et al. | |
| 10,823,841 B1 | 11/2020 | Lien et al. | |
| 10,908,696 B2 | 2/2021 | Amihood et al. | |
| 10,936,081 B2 | 3/2021 | Poupyrev | |
| 10,936,085 B2 | 3/2021 | Poupyrev et al. | |
| 10,948,996 B2 | 3/2021 | Poupyrev et al. | |
| 2001/0035836 A1 | 11/2001 | Miceli et al. | |
| 2002/0080156 A1 | 6/2002 | Abbott et al. | |
| 2002/0170897 A1 | 11/2002 | Hall | |
| 2003/0100228 A1 | 5/2003 | Bungo et al. | |
| 2003/0119391 A1 | 6/2003 | Swallow et al. | |
| 2004/0009729 A1 | 1/2004 | Hill et al. | |
| 2004/0046736 A1 | 3/2004 | Pryor et al. | |
| 2004/0157662 A1 | 8/2004 | Tsuchiya | |
| 2004/0259391 A1 | 12/2004 | Jung et al. | |
| 2005/0069695 A1 | 3/2005 | Jung et al. | |
| 2005/0128124 A1 | 6/2005 | Greneker et al. | |
| 2005/0148876 A1 | 7/2005 | Endoh et al. | |
| 2006/0035554 A1 | 2/2006 | Glaser et al. | |
| 2006/0040739 A1 | 2/2006 | Wells | |
| 2006/0139162 A1 | 6/2006 | Flynn | |
| 2006/0157734 A1 | 7/2006 | Onodero et al. | |
| 2006/0166620 A1 | 7/2006 | Sorensen | |
| 2006/0258205 A1 | 11/2006 | Locher et al. | |
| 2007/0026695 A1 | 2/2007 | Lee et al. | |
| 2007/0027369 A1 | 2/2007 | Pagnacco et al. | |
| 2007/0118043 A1 | 5/2007 | Oliver et al. | |
| 2007/0161921 A1 | 7/2007 | Rausch | |
| 2007/0176821 A1 | 8/2007 | Flom et al. | |
| 2007/0192647 A1 | 8/2007 | Glaser | |
| 2007/0197115 A1 | 8/2007 | Eves et al. | |
| 2007/0197878 A1 | 8/2007 | Shklarski | |
| 2007/0210074 A1 | 9/2007 | Maurer et al. | |
| 2008/0002027 A1 | 1/2008 | Kondo et al. | |
| 2008/0024438 A1 | 1/2008 | Collins et al. | |
| 2008/0065291 A1 | 3/2008 | Breed | |
| 2008/0134102 A1 | 6/2008 | Movold et al. | |
| 2008/0136775 A1 | 6/2008 | Conant | |
| 2008/0168396 A1 | 7/2008 | Matas et al. | |
| 2008/0211766 A1 | 9/2008 | Westerman et al. | |
| 2008/0233822 A1 | 9/2008 | Swallow et al. | |
| 2008/0282665 A1 | 11/2008 | Speleers | |
| 2008/0291158 A1 | 11/2008 | Park et al. | |
| 2008/0303800 A1 | 12/2008 | Elwell | |

(56) References Cited

U.S. PATENT DOCUMENTS

| | | |
|---|---|---|
| 2008/0316085 A1 | 12/2008 | Rofougaran et al. |
| 2008/0320419 A1 | 12/2008 | Matas et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder |
| 2009/0270690 A1 | 10/2009 | Roos et al. |
| 2009/0288762 A1 | 11/2009 | Wolfel |
| 2009/0292468 A1 | 11/2009 | Wu et al. |
| 2009/0295712 A1 | 12/2009 | Ritzau |
| 2009/0303100 A1 | 12/2009 | Zemany |
| 2010/0065320 A1 | 3/2010 | Urano |
| 2010/0071205 A1 | 3/2010 | Graumann et al. |
| 2010/0094141 A1 | 4/2010 | Puswella |
| 2010/0152600 A1 | 6/2010 | Droitcour et al. |
| 2010/0198067 A1 | 8/2010 | Mahfouz et al. |
| 2010/0201586 A1 | 8/2010 | Michalk |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0241009 A1 | 9/2010 | Petkie |
| 2010/0281438 A1 | 11/2010 | Latta et al. |
| 2010/0306713 A1 | 12/2010 | Geisner et al. |
| 2010/0313414 A1 | 12/2010 | Sheats |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0073353 A1 | 3/2011 | Lee et al. |
| 2011/0083111 A1 | 4/2011 | Forutanpour et al. |
| 2011/0093820 A1 | 4/2011 | Zhang et al. |
| 2011/0166940 A1 | 7/2011 | Bangera et al. |
| 2011/0181509 A1 | 7/2011 | Rautiainen et al. |
| 2011/0181510 A1 | 7/2011 | Hakala et al. |
| 2011/0197263 A1 | 8/2011 | Stinson, III |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0279303 A1 | 11/2011 | Smith |
| 2011/0303341 A1 | 12/2011 | Meiss et al. |
| 2011/0307842 A1 | 12/2011 | Chiang et al. |
| 2011/0318985 A1 | 12/2011 | McDermid |
| 2012/0001875 A1 | 1/2012 | Li et al. |
| 2012/0019168 A1 | 1/2012 | Noda et al. |
| 2012/0047468 A1 | 2/2012 | Santos et al. |
| 2012/0068876 A1 | 3/2012 | Bangera et al. |
| 2012/0092284 A1 | 4/2012 | Rofougaran et al. |
| 2012/0105358 A1 | 5/2012 | Momeyer et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0150493 A1 | 6/2012 | Casey et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0193801 A1 | 8/2012 | Gross et al. |
| 2012/0200600 A1 | 8/2012 | Demaine |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0280900 A1 | 11/2012 | Wang et al. |
| 2012/0310665 A1 | 12/2012 | Xu et al. |
| 2013/0016070 A1 | 1/2013 | Starner et al. |
| 2013/0046544 A1 | 2/2013 | Kay et al. |
| 2013/0053653 A1 | 2/2013 | Cuddihy et al. |
| 2013/0076788 A1 | 3/2013 | Ben Zvi |
| 2013/0082922 A1 | 4/2013 | Miller |
| 2013/0083173 A1 | 4/2013 | Geisner et al. |
| 2013/0102217 A1 | 4/2013 | Jeon |
| 2013/0104084 A1 | 4/2013 | Mlyniec et al. |
| 2013/0106710 A1 | 5/2013 | Ashbrook |
| 2013/0113647 A1 | 5/2013 | Sentelle et al. |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0161078 A1 | 6/2013 | Li |
| 2013/0169471 A1 | 7/2013 | Lynch |
| 2013/0176161 A1 | 7/2013 | Derham et al. |
| 2013/0194173 A1 | 8/2013 | Zhu et al. |
| 2013/0195330 A1 | 8/2013 | Kim et al. |
| 2013/0196716 A1 | 8/2013 | Muhammad |
| 2013/0207962 A1 | 8/2013 | Oberdorfer et al. |
| 2013/0222232 A1 | 8/2013 | Kong et al. |
| 2013/0249793 A1 | 9/2013 | Zhu et al. |
| 2013/0260630 A1 | 10/2013 | Ito et al. |
| 2013/0263029 A1 | 10/2013 | Rossi et al. |
| 2013/0278499 A1 | 10/2013 | Anderson |
| 2013/0278501 A1 | 10/2013 | Bulzacki |
| 2013/0283203 A1 | 10/2013 | Batraski et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0022108 A1 | 1/2014 | Alberth et al. |
| 2014/0028539 A1 | 1/2014 | Newham et al. |
| 2014/0035737 A1 | 2/2014 | Rashid et al. |
| 2014/0049487 A1 | 2/2014 | Konertz et al. |
| 2014/0070957 A1 | 3/2014 | Longinotti-Buitoni et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0097979 A1 | 4/2014 | Nohara et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0184496 A1 | 7/2014 | Gribetz et al. |
| 2014/0184499 A1 | 7/2014 | Kim |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0280295 A1 | 9/2014 | Kurochikin et al. |
| 2014/0281975 A1 | 9/2014 | Anderson |
| 2014/0297006 A1 | 10/2014 | Sadhu |
| 2014/0306936 A1 | 10/2014 | Dahl et al. |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368378 A1 | 12/2014 | Crain et al. |
| 2015/0002391 A1 | 1/2015 | Chen |
| 2015/0009096 A1 | 1/2015 | Lee et al. |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0068069 A1 | 3/2015 | Tran et al. |
| 2015/0077282 A1 | 3/2015 | Mohamadi |
| 2015/0084855 A1 | 3/2015 | Song et al. |
| 2015/0085060 A1 | 3/2015 | Fish et al. |
| 2015/0091858 A1 | 4/2015 | Rosenberg et al. |
| 2015/0091859 A1 | 4/2015 | Rosenberg et al. |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |

(56) References Cited

U.S. PATENT DOCUMENTS

| | | |
|---|---|---|
| 2015/0177374 A1 | 6/2015 | Driscoll et al. |
| 2015/0177866 A1 | 6/2015 | Hwang et al. |
| 2015/0199045 A1 | 7/2015 | Robucci et al. |
| 2015/0256763 A1 | 9/2015 | Niemi |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1 | 10/2015 | Sprenger et al. |
| 2015/0280102 A1 | 10/2015 | Tajitsu et al. |
| 2015/0285906 A1 | 10/2015 | Hooper et al. |
| 2015/0301167 A1 | 10/2015 | Sentelle et al. |
| 2015/0312041 A1 | 10/2015 | Choi |
| 2015/0323993 A1 | 11/2015 | Levesque et al. |
| 2015/0332075 A1 | 11/2015 | Burch |
| 2015/0346701 A1 | 12/2015 | Gordon et al. |
| 2015/0346820 A1 | 12/2015 | Poupyrev et al. |
| 2015/0370250 A1 | 12/2015 | Bachrach et al. |
| 2015/0375339 A1 | 12/2015 | Sterling et al. |
| 2016/0011668 A1 | 1/2016 | Gilad-Bachrach et al. |
| 2016/0018948 A1 | 1/2016 | Parvarandeh et al. |
| 2016/0026253 A1 | 1/2016 | Bradski et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0042169 A1 | 2/2016 | Polehn |
| 2016/0048235 A1 | 2/2016 | Poupyrev |
| 2016/0048236 A1 | 2/2016 | Poupyrev |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0077202 A1 | 3/2016 | Hirvonen et al. |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0124579 A1 | 5/2016 | Tokutake |
| 2016/0131741 A1 | 5/2016 | Park |
| 2016/0145776 A1 | 5/2016 | Roh |
| 2016/0186366 A1 | 6/2016 | McMaster |
| 2016/0216825 A1 | 7/2016 | Forutanpour |
| 2016/0234365 A1* | 8/2016 | Alameh ............ H04W 52/0254 |
| 2016/0249698 A1 | 9/2016 | Berzowska et al. |
| 2016/0252607 A1 | 9/2016 | Saboo et al. |
| 2016/0253044 A1 | 9/2016 | Katz |
| 2016/0259037 A1 | 9/2016 | Molchanov et al. |
| 2016/0262685 A1 | 9/2016 | Wagner et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0291143 A1 | 10/2016 | Cao et al. |
| 2016/0299526 A1 | 10/2016 | Inagaki et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2017/0011210 A1 | 1/2017 | Cheong et al. |
| 2017/0052618 A1 | 2/2017 | Lee et al. |
| 2017/0060254 A1 | 3/2017 | Molchanov et al. |
| 2017/0060298 A1 | 3/2017 | Hwang et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0124407 A1 | 5/2017 | Micks et al. |
| 2017/0125940 A1 | 5/2017 | Karagozler et al. |
| 2017/0196513 A1 | 7/2017 | Longinotti-Buitoni et al. |
| 2017/0232538 A1 | 8/2017 | Robinson et al. |
| 2017/0249033 A1 | 8/2017 | Podhajny et al. |
| 2017/0322633 A1 | 11/2017 | Shen et al. |
| 2017/0325337 A1 | 11/2017 | Karagozler et al. |
| 2017/0325518 A1 | 11/2017 | Poupyrev et al. |
| 2017/0329425 A1 | 11/2017 | Ragozler et al. |
| 2018/0004301 A1 | 1/2018 | Poupyrev |
| 2018/0046258 A1 | 2/2018 | Poupyrev |
| 2018/0106897 A1 | 4/2018 | Shouldice et al. |
| 2019/0232156 A1 | 8/2019 | Amihood et al. |
| 2019/0257939 A1 | 8/2019 | Schwesig et al. |
| 2019/0321719 A1 | 10/2019 | Gillian et al. |
| 2019/0391667 A1 | 12/2019 | Poupyrev |
| 2019/0394884 A1 | 12/2019 | Karagozler et al. |
| 2020/0064924 A1 | 2/2020 | Poupyrev et al. |
| 2020/0089314 A1 | 3/2020 | Poupyrev et al. |
| 2020/0150776 A1 | 5/2020 | Poupyrev et al. |
| 2020/0218361 A1 | 7/2020 | Poupyrev |
| 2020/0278422 A1 | 9/2020 | Lien et al. |
| 2020/0326708 A1 | 10/2020 | Wang et al. |
| 2020/0393912 A1 | 12/2020 | Lien et al. |
| 2020/0409472 A1 | 12/2020 | Lien et al. |
| 2021/0096653 A1 | 4/2021 | Amihood et al. |
| 2021/0132702 A1 | 5/2021 | Poupyrev |

FOREIGN PATENT DOCUMENTS

| | | |
|---|---|---|
| CN | 103091667 | 5/2013 |
| CN | 103534664 | 1/2014 |
| CN | 103675868 | 3/2014 |
| CN | 104115118 | 10/2014 |
| CN | 103355860 | 1/2016 |
| CN | 106154270 | 11/2016 |
| DE | 102011075725 | 11/2012 |
| DE | 102013201359 | 7/2014 |
| EP | 0161895 | 11/1985 |
| EP | 1815788 | 8/2007 |
| GB | 2070469 | 9/1981 |
| GB | 2443208 | 4/2008 |
| JP | 2003280049 | 10/2003 |
| JP | 2006234716 | 9/2006 |
| JP | 2007333385 | 12/2007 |
| JP | 2011102457 | 5/2011 |
| WO | WO-0130123 | 4/2001 |
| WO | WO-2001027855 | 4/2001 |
| WO | WO-0175778 | 10/2001 |
| WO | WO-2002082999 | 10/2002 |
| WO | WO-2005033387 | 4/2005 |
| WO | 2007125298 | 11/2007 |
| WO | WO-2008061385 | 5/2008 |
| WO | WO-2009032073 | 3/2009 |
| WO | 2009083467 | 7/2009 |
| WO | WO-2010032173 | 3/2010 |
| WO | WO-2012026013 | 3/2012 |
| WO | WO-2012152476 | 11/2012 |
| WO | WO-2013082806 | 6/2013 |
| WO | WO-2013084108 | 6/2013 |
| WO | WO-2013186696 | 12/2013 |
| WO | WO-2013191657 | 12/2013 |
| WO | WO-2014019085 | 2/2014 |
| WO | WO-2014116968 | 7/2014 |
| WO | WO-2014136027 | 9/2014 |
| WO | WO-2014138280 | 9/2014 |
| WO | WO-2014160893 | 10/2014 |
| WO | WO-2014165476 | 10/2014 |
| WO | WO-2014204323 | 12/2014 |
| WO | WO-2015017931 | 2/2015 |
| WO | WO-2015022671 | 2/2015 |
| WO | 2016053624 | 4/2016 |
| WO | 2017062566 | 4/2017 |
| WO | 20170200949 | 11/2017 |

OTHER PUBLICATIONS

"Corrected Notice of Allowance", U.S. Appl. No. 14/930,220, dated Mar. 20, 2017, 2 pages.

"Corrected Notice of Allowance", U.S. Appl. No. 14/930,220, dated May 11, 2017, 2 pages.

"Final Office Action", U.S. Appl. No. 14/518,863, dated May 5, 2017, 18 pages.

"First Action Interview Office Action", U.S. Appl. No. 14/959,901, dated Apr. 14, 2017, 3 pages.

"International Preliminary Report on Patentability", Application No. PCT/US2015/050903, dated Apr. 13, 2017, 12 pages.

(56) References Cited

OTHER PUBLICATIONS

"International Search Report and Written Opinion", Application No. PCT/US2016/060399, dated Jan. 30, 2017, 11 pages.
"Non-Final Office Action", U.S. Appl. No. 14/504,038, dated Mar. 22, 2017, 33 pages.
"Non-Final Office Action", U.S. Appl. No. 15/403,066, dated May 4, 2017, 31 pages.
"Pre-Interview Communication", U.S. Appl. No. 15/343,067, dated Apr. 19, 2017, 3 pages.
"Textile Wire Brochure", Retrieved at: http://www.textile-wire.ch/en/home.html, Aug. 7, 2004, 17 pages.
Stoppa, "Wearable Electronics and Smart Textiles: A Critical Review", In Proceedings of Sensors, vol. 14, Issue 7, Jul. 7, 2014, pp. 11957-11992.
"International Search Report and Written Opinion", PCT/US20171047691, dated Nov. 16, 2017, 13.
"Advisory Action", U.S. Appl. No. 14/504,139, dated Aug. 28, 2017, 3 pages.
"Final Office Action", U.S. Appl. No. 14/959,901, dated Aug. 25, 2017, 19 pages.
"Final Office Action", U.S. Appl. No. 15/403,066, dated Oct. 5, 2017, 31 pages.
"Non-Final Office Action", U.S. Appl. No. 15/093,533, dated Aug. 24, 2017, 18 pages.
"Non-Final Office Action", U.S. Appl. No. 15/142,619, dated Aug. 25, 2017, 16 pages.
"Non-Final Office Action", U.S. Appl. No. 14/959,799, dated Sep. 8, 2017, 16 pages.
"Non-Final Office Action", U.S. Appl. No. 15/398,147, dated Sep. 8, 2017, 7 pages.
"Non-Final Office Action", U.S. Appl. No. 14/518,863, dated Sep. 29, 2017, 20 pages.
"Non-Final Office Action", U.S. Appl. No. 15/142,689, dated Oct. 4, 2017, 18 pages.
"Pre-Interview Office Action", U.S. Appl. No. 14/862,409, dated Sep. 15, 2017, 16 pages.
"Written Opinion", PCT Application No. PCT/US2016/055671, dated Apr. 13, 2017, 8 pages.
"Written Opinion", PCT Application No. PCT/US2017/032733, dated Jul. 26, 2017, 5 pages.
"Combined Search and Examination Report", GB Application No. 1620891.0, dated May 31, 2017, 9 pages.
"Final Office Action", U.S. Appl. No. 15/398,147, dated Jun. 30, 2017, 11 pages.
"Final Office Action", U.S. Appl. No. 14/874,955, dated Jun. 30, 2017, 9 pages.
"Final Office Action", U.S. Appl. No. 14/959,799, dated Jul. 19, 2017, 12 pages.
"Final Office Action", U.S. Appl. No. 14/504,121, dated Aug. 8, 2017, 16 pages.
"International Search Report and Written Opinion", Application No. PCT/US2016/063874, dated May 11, 2017, 19 pages.
"Non-Final Office Action", U.S. Appl. No. 14/862,409, dated Jun. 22, 2017, 15 pages.
"Non-Final Office Action", U.S. Appl. No. 14/959,730, dated Jun. 23, 2017, 14 pages.
"Notice of Allowance", U.S. Appl. No. 14/513,875, dated Jun. 28, 2017, 7 pages.
"Notice of Allowance", U.S. Appl. No. 15/343,067, dated Jul. 27, 2017, 9 pages.
"Notice of Allowance", U.S. Appl. No. 14/504,038, dated Aug. 7, 2017, 17 pages.
"Notice of Allowance", U.S. Appl. No. 14/494,863, dated May 30, 2017, 7 pages.
"Corrected Notice of Allowance", U.S. Appl. No. 14/312,486, dated Jan. 23, 2017, 4 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Dec. 19, 2016, 2 pages.
"Non-Final Office Action", U.S. Appl. No. 14/504,121, dated Jan. 9, 2017, 13 pages.
"Non-Final Office Action", U.S. Appl. No. 14/504,139, dated Jan. 27, 2017, 10 pages.
"Non-Final Office Action", U.S. Appl. No. 14/959,799, dated Jan. 27, 2017, 10 pages.
"Notice of Allowance", U.S. Appl. No. 14/930,220, dated Feb. 2, 2017, 8 pages.
"Pre-Interview Communication", U.S. Appl. No. 14/494,863, dated Jan. 27, 2017, 5 pages.
"Pre-Interview Communication", U.S. Appl. No. 14/959,901, dated Feb. 10, 2017, 3 pages.
"Corrected Notice of Allowance", U.S. Appl. No. 14/312,486, dated Oct. 28, 2016, 4 pages.
"International Search Report and Written Opinion", Application No. PCT/US2016/024289, dated Aug. 25, 2016, 17 pages.
"Non-Final Office Action", U.S. Appl. No. 14/518,863, dated Oct. 14, 2016, 16 pages.
"Notice of Allowance", U.S. Appl. No. 14/312,486, dated Oct. 7, 2016, 15 pages.
"Notice of Allowance", U.S. Appl. No. 14/582,896, dated Nov. 7, 2016, 5 pages.
"Pre-Interview Communication", U.S. Appl. No. 14/513,875, dated Oct. 21, 2016, 3 pages.
Cheng, "Smart Textiles: From Niche to Mainstream", IEEE Pervasive Computing, Jul. 2013, pp. 81-84.
Farringdon, "Wearable Sensor Badge & Sensor Jacket for Context Awareness", Third International Symposium on Wearable Computers, Oct. 1999, 7 pages.
Pu, "Gesture Recognition Using Wireless Signals", Oct. 2014, pp. 15-18.
Schneegass, "Towards a Garment OS: Supporting Application Development for Smart Garments", Wearable Computers, ACM, Sep. 2014, 6 pages.
"Cardiio", Retrieved From: <http://www.cardiio.com/> Apr. 15, 2015 App Information Retrieved From: <https://itunes.apple.com/us/app/cardiio-touchless-camera-pulse/id542891434?ls=1&mt=8> Apr. 15, 2015, Feb. 24, 2015, 6 pages.
"Extended European Search Report", EP Application No. 15170577.9, dated Nov. 5, 2015, 12 pages.
"Final Office Action", U.S. Appl. No. 14/312,486, dated Jun. 3, 2016, 32 pages.
"Final Office Action", U.S. Appl. No. 14/504,038, dated Sep. 27, 2016, 23 pages.
"Final Office Action", U.S. Appl. No. 14/504,061, dated Mar. 9, 2016, 10 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"International Search Report and Written Opinion", Application No. PCT/US2015/044774, dated Nov. 3, 2015, 12 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.
"International Search Report and Written Opinion", Application No. PCT/US2016/032307, dated Aug. 25, 2016, 13 pages.
"International Search Report and Written Opinion", Application No. PCT/US2016/029820, dated Jul. 15, 2016, 14 pages.
"International Search Report and Written Opinion", Application No. PCT/US2016/030177, dated Aug. 2, 2016, 15 pages.
"International Search Report and Written Opinion", Application No. PCT/US2015/043963, dated Nov. 24, 2015, 16 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.
"International Search Report and Written Opinion", Application No. PCT/US2015/043949, dated Dec. 1, 2015, 18 pages.
"Non-Final Office Action", U.S. Appl. No. 14/312,486, dated Oct. 23, 2015, 25 pages.

(56) References Cited

OTHER PUBLICATIONS

"Non-Final Office Action", U.S. Appl. No. 14/504,038, dated Feb. 26, 2016, 22 pages.
"Non-Final Office Action", U.S. Appl. No. 14/504,061, dated Nov. 4, 2015, 8 pages.
"Non-Final Office Action", U.S. Appl. No. 14/582,896, dated Jun. 29, 2016, 9 pages.
"Non-Final Office Action", U.S. Appl. No. 14/666,155, dated Aug. 24, 2016, 9 pages.
"Non-Final Office Action", U.S. Appl. No. 14/681,625, dated Aug. 12, 2016, 9 pages.
"Non-Final Office Action", U.S. Appl. No. 14/930,220, dated Sep. 14, 2016, 15 pages.
"Notice of Allowance", U.S. Appl. No. 14/504,061, dated Sep. 12, 2016, 7 pages.
"Philips Vital Signs Camera", Retrieved From: <http://www.vitalsignscamera.com/> Apr. 15, 2015, Jul. 17, 2013, 2 pages.
"Restriction Requirement", U.S. Appl. No. 14/666,155, dated Jul. 22, 2016, 5 pages.
"The Instant Blood Pressure app estimates blood pressure with your smartphone and our algorithm", Retrieved at: http://www.instantbloodpressure.com/—on Jun. 23, 2016, 6 pages.
Arbabian,"A 94GHz mm-Wave to Baseband Pulsed-Radar for Imaging and Gesture Recognition", 2012 IEEE, 2012 Symposium on VLSI Circuits Digest of Technical Papers, 2012, 2 pages.
Balakrishnan,"Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.
Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.
Espina,"Wireless Body Sensor Network for Continuous Cuff-less Blood Pressure Monitoring", International Summer School on Medical Devices and Biosensors, 2006, Sep. 2006, 5 pages.
Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
He,"A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.
Holleis,"Evaluating Capacitive Touch Input on Clothes", Proceedings of the 10th International Conference on Human Computer Interaction, Jan. 1, 2008, 10 pages.
Nakajima,"Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, Aug. 2001, 8 pages.
Patel,"Applications of Electrically Conductive Yarns in Technical Textiles", International Conference on Power System Technology (POWECON), Oct. 30, 2012, 6 pages.
Poh,"A Medical Mirror for Non-contact Health Monitoring", In Proceedings: ACM SIGGRAPH Emerging Technologies Available at: <http://affect.media.mit.edu/pdfs/11.Poh-etal-SIGGRAPH.pdf>, 2011, 1 page.
Poh,"Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378002%5F199381%2Foe%2D18%2D10%2D10762%2Ep, May 7, 2010, 13 pages.

Pu,"Whole-Home Gesture Recognition Using Wireless Signals", MobiCom '13 Proceedings of the 19th annual international conference on Mobile computing & networking, Aug. 27, 2013, 12 pages.
Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.
Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
Wijesiriwardana,"Capacitive Fibre-Meshed Transducer for Touch & Proximity Sensing Applications", IEEE Sensors Journal, IEEE Service Center, Oct. 1, 2005, 5 pages.
Zhadobov,"Millimeter-wave Interactions with the Human Body: State of Knowledge and Recent Advances", International Journal of Microwave and Wireless Technologies, Mar. 1, 2011, 11 pages.
Zhang,"Study of the Structural Design and Capacitance Characteristics of Fabric Sensor", Advanced Materials Research (vols. 194-196), Feb. 21, 2011, 8 pages.
"Final Office Action", U.S. Appl. No. 15/142,619, dated Feb. 8, 2018, 15 pages.
"Final Office Action", U.S. Appl. No. 15/093,533, dated Mar. 21, 2018, 19 pages.
"First Action Interview Office Action", U.S. Appl. No. 15/286,152, dated Mar. 1, 2018, 5 pages.
"Foreign Office Action", Chinese Application No. 201721290290.3, dated Mar. 9, 2018, 2 pages.
"Non-Final Office Action", U.S. Appl. No. 15/267,181, dated Feb. 8, 2018, 29 pages.
"Non-Final Office Action", U.S. Appl. No. 14/874,955, dated Feb. 8, 2018, 7 pages.
"Notice of Allowance", U.S. Appl. No. 14/959,730, dated Feb. 22, 2018, 8 pages.
"Pre-Interview Communication", U.S. Appl. No. 15/166,198, dated Mar. 8, 2018, 8 pages.
"Pre-Interview First Office Action", U.S. Appl. No. 15/286,152, dated Feb. 8, 2018, 4 pages.
"Corrected Notice of Allowance", U.S. Appl. No. 14/582,896, dated Feb. 23, 2017, 2 pages.
"International Preliminary Report on Patentability", Application No. PCT/US2015/043963, dated Feb. 16, 2017, 12 pages.
"International Preliminary Report on Patentability", Application No. PCT/US2015/030388, dated Dec. 15, 2016, 12 pages.
"International Preliminary Report on Patentability", Application No. PCT/US2015/043949, dated Feb. 16, 2017, 13 pages.
"International Preliminary Report on Patentability", Application No. PCT/US2015/044774, dated Mar. 2, 2017, 8 pages.
"International Search Report and Written Opinion", Application No. PCT/US2016/062082, dated Feb. 23, 2017, 12 pages.
"International Search Report and Written Opinion", Application No. PCT/US2016/055671, dated Dec. 1, 2016, 14 pages.
"Non-Final Office Action", U.S. Appl. No. 14/513,875, dated Feb. 21, 2017, 9 pages.
"Non-Final Office Action", U.S. Appl. No. 14/874,955, dated Feb. 27, 2017, 8 pages.
"Non-Final Office Action", U.S. Appl. No. 15/398,147, dated Mar. 9, 2017, 10 pages.
"Pre-Interview Communication", U.S. Appl. No. 14/959,730, dated Feb. 15, 2017, 3 pages.
"Pre-Interview Communication", U.S. Appl. No. 16/401,611, dated Apr. 13, 2020, 4 Pages.
"Final Office Action", U.S. Appl. No. 15/287,394, dated Sep. 30, 2019, 38 Pages.
"Final Office Action", U.S. Appl. No. 15/286,512, dated Dec. 26, 2018, 15 pages.
"Final Office Action", U.S. Appl. No. 15/287,308, dated Feb. 8, 2019, 23 pages.
"Final Office Action", U.S. Appl. No. 15/287,155, dated Apr. 10, 2019, 11 pages.
"Final Office Action", U.S. Appl. No. 15/286,537, dated Apr. 19, 2019, 21 pages.
"Final Office Action", U.S. Appl. No. 15/287,253, dated Apr. 2, 2019, 10 pages.

(56) References Cited

OTHER PUBLICATIONS

"Final Office Action", U.S. Appl. No. 15/286,152, dated Jun. 26, 2018, 25 pages.
"Final Office Action", U.S. Appl. No. 15/267,181, dated Jun. 7, 2018, 31 pages.
"First Action Interview Office Action", U.S. Appl. No. 15/142,471, dated Feb. 5, 2019, 29 pages.
"Non-Final Office Action", U.S. Appl. No. 15/286,537, dated Sep. 3, 2019, 28 Pages.
"Non-Final Office Action", U.S. Appl. No. 15/287,253, dated Sep. 7, 2018, 20 pages.
"Non-Final Office Action", U.S. Appl. No. 15/287,308, dated Oct. 15, 2018, 18 pages.
"Non-Final Office Action", U.S. Appl. No. 15/286,152, dated Oct. 19, 2018, 27 pages.
"Non-Final Office Action", U.S. Appl. No. 15/286,837, dated Oct. 26, 2018, 10 pages.
"Non-Final Office Action", U.S. Appl. No. 15/286,537, dated Nov. 19, 2018, 18 pages.
"Non-Final Office Action", U.S. Appl. No. 15/287,155, dated Dec. 10, 2018, 12 pages.
"Non-Final Office Action", U.S. Appl. No. 15/287,394, dated Mar. 22, 2019, 39 pages.
"Non-Final Office Action", U.S. Appl. No. 15/287,253, dated Apr. 5, 2018, 17 pages.
"Non-Final Office Action", U.S. Appl. No. 15/286,512, dated Jul. 19, 2018, 15 pages.
"Notice of Allowance", U.S. Appl. No. 15/287,394, dated Mar. 4, 2020, 11 Pages.
"Notice of Allowance", U.S. Appl. No. 15/287,253, dated Aug. 26, 2019, 13 Pages.
"Notice of Allowance", U.S. Appl. No. 15/286,495, dated Jan. 17, 2019, 5 pages.
"Notice of Allowance", U.S. Appl. No. 15/287,200, dated Nov. 6, 2018, 19 pages.
"Notice of Allowance", U.S. Appl. No. 15/286,152, dated Mar. 5, 2019, 23 pages.
"Notice of Allowance", U.S. Appl. No. 15/286,837, dated Mar. 6, 2019, 7 pages.
"Notice of Allowance", U.S. Appl. No. 15/286,512, dated Apr. 9, 2019, 14 pages.
"Pre-Interview Communication", U.S. Appl. No. 15/286,495, dated Sep. 10, 2018, 4 pages.
"Pre-Interview Communication", U.S. Appl. No. 15/142,471, dated Dec. 12, 2018, 3 pages.
"Restriction Requirement", U.S. Appl. No. 15/286,537, dated Aug. 27, 2018, 8 pages.
Geisheimer, et al., "A Continuous-Wave (CW) Radar for Gait Analysis", IEEE 2001, 2001, 5 pages.
Sodana, "Human Movement Characterization in Indoor Environment using GNU Radio Based Radar", Retrieved at: http://repository.tudelft.nl/islandora/object/uuid:414e1868-dd00-4113-9989-4c213f1t7094?collection=education, Nov. 30, 2009, 100 pages.
Gurbuz, et al., "Detection and Identification of Human Targets in Radar Data", Proc. SPIE 6567, Signal Processing, Sensor Fusion, and Target Recognition XVI, 656701, May 7, 2007, 12 pages.
"Foreign Office Action", Korean Application No. 1020187004283, dated Jan. 3, 2020, 8 pages.
"Non-Final Office Action", U.S. Appl. No. 16/252,477, dated Jan. 10, 2020, 13 Pages.
"Notice of Allowance", U.S. Appl. No. 15/462,957, dated Jan. 23, 2020, 8 Pages.
"Notice of Allowance", U.S. Appl. No. 16/356,748, dated Feb. 11, 2020, 5 Pages.
"Notice of Allowance", U.S. Appl. No. 15/791,044, dated Feb. 12, 2020, 8 Pages.
"Notice of Allowance", U.S. Appl. No. 16/153,395, dated Feb. 20, 2020, 13 Pages.
"Foreign Office Action", CN Application No. 201680038897.4, dated Jun. 29, 2020, 28 pages.
"Foreign Office Action", JP Application No. 2019-078554, dated Jul. 21, 2020, 12 pages.
"Foreign Office Action", IN Application No. 201747044162, dated Sep. 3, 2020, 7 pages.
"Non-Final Office Action", U.S. Appl. No. 16/503,234, dated Aug. 5, 2020, 18 Pages.
"Non-Final Office Action", U.S. Appl. No. 16/744,626, dated Sep. 23, 2020, 9 Pages.
"Non-Final Office Action", U.S. Appl. No. 16/669,842, dated Sep. 3, 2020, 12 pages.
"Notice of Allowance", U.S. Appl. No. 15/142,471, dated Aug. 6, 2020, 7 Pages.
"Notice of Allowance", U.S. Appl. No. 16/380,245, dated Sep. 15, 2020, 7 Pages.
"Foreign Office Action", Chinese Application No. 201710922856.8, dated Jun. 19, 2020, 11 pages.
"Notice of Allowance", U.S. Appl. No. 16/401,611, dated Jun. 10, 2020, 17 Pages.
"Notice of Allowance", U.S. Appl. No. 16/252,477, dated Jun. 24, 2020, 8 Pages.
"Notice of Allowance", U.S. Appl. No. 15/093,533, dated Jul. 16, 2020, 5 Pages.
"Pre-Interview Communication", U.S. Appl. No. 16/380,245, dated Jun. 15, 2020, 3 Pages.
"Corrected Notice of Allowance", U.S. Appl. No. 16/380,245, dated Jan. 6, 2021, 2 pages.
"Corrected Notice of Allowance", U.S. Appl. No. 16/252,477, dated Sep. 30, 2020, 2 pages.
"Corrected Notice of Allowance", U.S. Appl. No. 16/380,245, dated Jan. 15, 2020, 2 pages.
"Corrected Notice of Allowance", U.S. Appl. No. 16/560,085, dated Dec. 14, 2020, 2 pages.
"Corrected Notice of Allowance", U.S. Appl. No. 16/380,245, dated Dec. 18, 2020, 2 pages.
"Final Office Action", U.S. Appl. No. 16/503,234, dated Dec. 30, 2020, 14 pages.
"Foreign Office Action", Japanese Application No. 2020027181, dated Nov. 17, 2020, 16 pages.
"Foreign Office Action", EP Application No. 167843523, dated Dec. 9, 2020, 5 pages.
"Foreign Office Action", KR Application No. 1020187004283, dated Sep. 11, 2020, 5 pages.
"Non-Final Office Action", U.S. Appl. No. 16/689,519, dated Oct. 20, 2020, 22 pages.
"Notice of Allowability", U.S. Appl. No. 16/560,085, dated Nov. 12, 2020, 2 pages.
"Notice of Allowance", U.S. Appl. No. 16/744,626, dated Jan. 1, 2021, 10 pages.
"Notice of Allowance", U.S. Appl. No. 16/560,085, dated Oct. 19, 2020, 8 pages.
"Notice of Allowance", U.S. Appl. No. 16/669,842, dated Dec. 18, 2020, 8 pages.
Guerra, et al., "Millimeter-Wave Personal Radars for 3D Environment Mapping", 48th ASILOMAR Conference on Signals, Systems and Computer, Nov. 2014, pp. 701-705.
Zheng, et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, Dec. 9, 2013 (Dec. 9, 2013), p. 3, XP032574214, DOI: 10.1109/IMWS-BIO.2013.6756200, Dec. 9, 2013, 3 Pages.
"Final Office Action", U.S. Appl. No. 14/959,799, dated Jan 4, 2018, 17 pages.
"Final Office Action", U.S. Appl. No. 14/959,730, dated Nov. 22, 2017, 16 pages.
"International Search Report and Written Opinion", PCT/US2017/047691, dated Nov. 16, 2017, 13.
"International Search Report and Written Opinion", PCT Application No. PCT/US2017/051663, dated Nov. 29, 2017, 16 pages.
"Non-Final Office Action", U.S. Appl. No. 14/504,121, dated Jan. 2, 2018, 19 pages.
"Non-Final Office Action", U.S. Appl. No. 14/959,901, dated Jan. 8, 2018, 21 pages.

(56) References Cited

OTHER PUBLICATIONS

"Non-Final Office Action", U.S. Appl. No. 14/504,139, dated Oct. 18, 2017, 12 pages.
"Non-Final Office Action", U.S. Appl. No. 15/595,649, dated Oct. 31, 2017, 16 pages.
"Non-Final Office Action", U.S. Appl. No. 14/862,409, dated Dec. 14, 2017, 17 pages.
"Notice of Allowance", U.S. Appl. No. 15/403,066, dated Jan. 8, 2018, 18 pages.
"Notice of Allowance", U.S. Appl. No. 14/874,955, dated Oct. 20, 2017, 7 pages.
"Notice of Allowance", U.S. Appl. No. 15/398,147, dated Nov. 15, 2017, 8 pages.
"Notice of Publication", U.S. Appl. No. 15/703,511, dated Jan. 4, 2018, 1 page.
"Restriction Requirement", U.S. Appl. No. 15/362,359, dated Jan. 8, 2018, 5 pages.
Bondade, et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, Sep. 14, 2014, 5 pages.
Fan, et al., "Wireless Hand-Gesture Recognition Based on Continuous-Wave Doppler Radar Sensors", IEEE Transactions on Microwave Theory and Techniques, Plenum, USA, vol. 64, No. 11, Nov. 1, 2016 (Nov. 1, 2016), pp. 4012-4012, XP011633246, ISSN: 0018-9480, DOI: 10.1109/TMTT.2016.2610427, Nov. 1, 2016, 9 pages.
Lien, et al., "Soli: Ubiquitous Gesture Sensing with Millimeter Wave Radar", ACM Transactions on Graphics (TOG), ACM, US, vol. 35, No. 4, Jul. 11, 2016 (Jul. 11, 2016), pp. 1-19, XP058275791, ISSN: 0730-0301, DOI: 10.1145/2897824.2925953, Jul. 11, 2016, 19 pages.
Martinez-Garcia, et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016), pp. 151-160, XP035898949, ISSN: 0925-1030, DOI: 10.1007/S10470-016-0747-8, Apr. 23, 2016, 10 pages.
Skolnik, "CW and Frequency-Modulated Radar", In: "Introduction to Radar Systems", Jan. 1, 1981 (Jan. 1, 1981), McGraw Hill, XP055047545, ISBN: 978-0-07-057909-5 pp. 68-100, p. 95-p. 97, Jan. 1, 1981, 18 pages.
"Corrected Notice of Allowance", U.S. Appl. No. 16/560,085, dated Jan. 28, 2021, 2 pages.
"Corrected Notice of Allowance", U.S. Appl. No. 16/744,626, dated Feb. 3, 2021, 2 pages.
"Corrected Notice of Allowance", U.S. Appl. No. 16/669,842, dated Feb. 18, 2021, 2 pages.
"Foreign Office Action", CN Application No. 201680038897.4, dated Feb. 1, 2021, 30 pages.
"Non-Final Office Action", U.S. Appl. No. 16/822,601, dated Mar. 15, 2021, 17 pages.
"Non-Final Office Action", U.S. Appl. No. 16/503,234, Mar. 18, 2021, 17 pages.
"Non-Final Office Action", U.S. Appl. No. 17/005,207, dated Apr. 1, 2021, 23 pages.
"Restriction Requirement", U.S. Appl. No. 16/563,124, dated Apr. 5, 2021, 7 pages.
Felch, et al., "Standard Radar API: Proposal Version 0.1", Technical Disclosure Commons, Jan. 24, 2021, 18 pages.
"Final Office Action", U.S. Appl. No. 16/689,519, dated Apr. 29, 2021, 13 pages.
"Foreign Office Action", KR Application No. 1020217011901, dated Jun. 4, 2021, 5 pages.
"Notice of Allowance", U.S. Appl. No. 14/504,121, dated Jun. 1, 2021, 8 pages.
"Notice of Allowance", U.S. Appl. No. 16/503,234, dated Jun. 11, 2021, 8 pages.
"Patent Board Decision", U.S. Appl. No. 14/504,121, dated May 20, 2021, 9 pages.

* cited by examiner

US 11,080,556 B1

USER-CUSTOMIZABLE MACHINE-LEARNING IN RADAR-BASED GESTURE DETECTION

PRIORITY

This application claims priority to U.S. Provisional patent Application Ser. No. 62/237,975 filed on Oct. 6, 2015, the disclosure of which is incorporated by reference herein in its entirety.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Computers and applications assign a default input mechanism to an action response as a way to interpret user commands. For example, pressing a space bar on a keyboard results in a word processing application interpreting the input as a command to enter a space into a document. At times, a user may desire to override the default input mechanism with a customized interaction instead. For instance, the user may desire to call for help, but is unable to reach a mobile phone to enter the predetermined input associated with making a call, or has a disability that prevents them from performing the actions necessary to enter the input. Thus, predetermined inputs for a computing device may constrain the user and be unsuited to their needs.

SUMMARY

This Summary is provided to introduce a selection of concepts in a simplified form that are further described below in the Detailed Description. This Summary is not intended to identify key features or essential features of the claimed subject matter.

A user can train a radar-based gesture detection system to dynamically learn user-customizable input gestures. In some cases, the user can dynamically perform a gesture unknown to the radar-based gesture detection system without touching or holding an input device coupled to the radar-based gesture detection system. In turn, the radar-based gesture detection system can learn one or more identifying characteristics about the gesture, and generate a machine-learning model that can be used to identify the gesture at a later point in time.

BRIEF DESCRIPTION OF THE DRAWINGS

Various aspects of user-customizable input gestures are described with reference to the following drawings. The same numbers are used throughout the drawings to reference like features and components.

DETAILED DESCRIPTION

Overview

Various embodiments dynamically learn user-customizable input gestures. A user can transition a radar-based gesture detection system into a gesture-learning mode. In turn, the radar-based gesture detection system emits a radar field configured to detect a gesture new to the radar-based gesture detection system performed by a user in the radar field. The radar-based gesture detection system receives incoming radio frequency (RF) signals generated by the outgoing radar field reflecting off the new gesture, and analyzes the incoming RF signals to learn one or more identifying characteristics about the new gesture. Upon learning the identifying characteristics, the radar-based gesture detection system reconfigures a corresponding input identification system to detect the new gesture when the one or more identifying characteristics are next identified, and transitions out of the gesture-learning mode.

In the following discussion, an example environment is first described in which various embodiments can be employed. Following this is a discussion of example RF signal propagation properties and how they can be employed in accordance with one or more embodiments. After this, dynamic learning of user-customizable input gestures is described. Finally, an example device is described in which various embodiments of machine-learning of user-customizable gestures can be employed.

Example Environment

Figure 1:
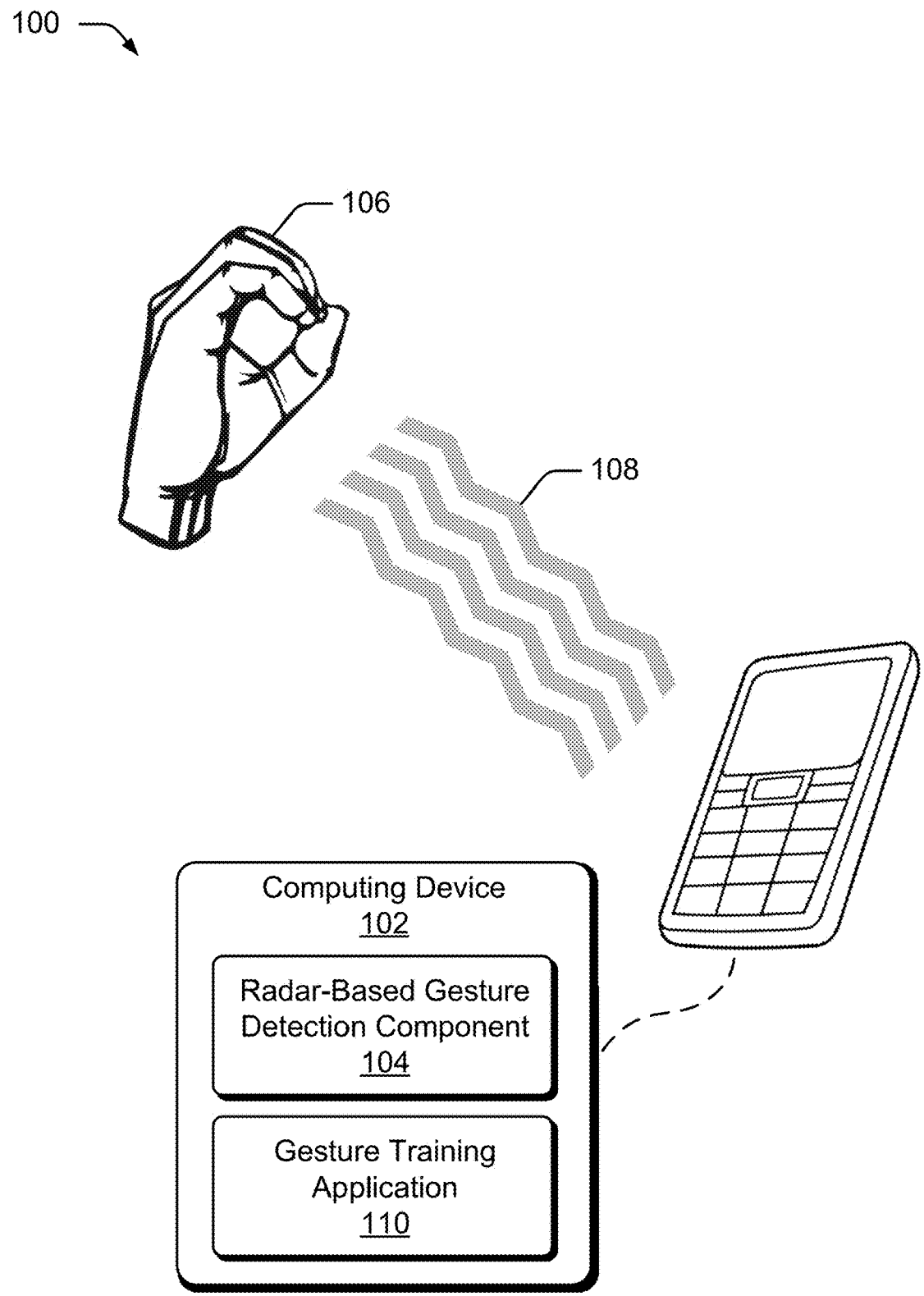
FIG. 1 illustrates an example environment that employs user-customizable gesture learning in accordance with one or more embodiments.

FIG. 1 illustrates an example environment 100 in which radar-based gesture-learning can be employed. The example environment 100 includes computing device 102 having a radar-based gesture detection component 104 capable of wirelessly sensing, detecting, and recognizing gestures performed by hand 106. In this example environment, computing device 102 is illustrated as a mobile device, but it is to be appreciated that this is merely for discussion purposes, and that other devices can be utilized without departing from the scope of the claimed subject matter.

Radar-based gesture detection component 104 represents functionality that wirelessly captures characteristics of a target object, illustrated here as hand 106. In this example, radar-based gesture detection component 104 is a hardware component of computing device 102. In some cases, radar-based gesture detection component 104 not only captures characteristics about hand 106, but can additionally identify a specific gesture performed by hand 106 from other gestures. Any suitable type of characteristic or gesture can be captured or identified, such as an associated size of the hand, a directional movement of the hand, a micro-gesture performed by all or a portion of the hand (e.g., a single-tap gesture, a double-tap gesture, a left-swipe, a forward-swipe, a right-swipe, a finger making a shape, etc.), and so forth. The term micro-gesture is used to signify a gesture that can be identified from other gestures based on differences in movement using a scale on the order of millimeters to sub-millimeters. Alternately or additionally, radar-based gesture detection component 104 can be configured to identify gestures on a larger scale than a micro-gesture (e.g., a macro-gesture that is identified by differences with a coarser resolution than a micro-gesture, such as differences measured in centimeters or meters).

Hand 106 represents a target object that radar-based gesture detection component 104 is in process of detecting. Here, hand 106 resides in free-space. Being in free-space, hand 106 has no physical devices attached to it that couple to, or communicate with, computing device 102 and/or radar-based gesture detection component 104. While this example is described in the context of detecting hand 106, it is to be appreciated that radar-based gesture detection component 104 can be used to capture characteristics of any other suitable type of target object, such as a head, a component of the head (eyes, tongue, ear, etc.), a finger, and so forth.

Signals 108 generally represent one or more RF signals transmitted and received by radar-based gesture detection component 104. In some embodiments, radar-based gesture detection component 104 transmits a radar signal using a single antenna and is generally directed towards hand 106. In other embodiments, multiple radar signals are transmitted, each on a respective antenna. As a transmitted signal reaches hand 106, at least a portion reflects back to radar-based gesture detection component 104 and is processed, as further described below. Signals 108 can have any suitable combination of energy level, carrier frequency, burst periodicity, pulse width, modulation type, waveform, phase relationship, and so forth. In some cases, some or all of the respective signals transmitted in signals 108 differs from one another to create a specific diversity scheme, such as a time diversity scheme that transmits multiple versions of a same signal at different points in time, a frequency diversity scheme that transmits signals using several different frequency channels, a space diversity scheme that transmits signals over different propagation paths, etc.

Computing device 102 also includes gesture training application 110. Among other things, gesture training application 110 represents functionality that configures radar-based detection component 104 to detect and learn gestures that are new or unknown to the radar-based detection component. For instance, a user can access gesture training application 110 to review a help guide that includes instructions on how to train radar-based gesture detection component 104 with user-customized gestures. Gesture training application 110 also controls the gesture-learning process by hiding from the user any configuration parameters used by radar-based detection component 104 to configure and initiate transmission of signals 108 for gesture-learning purposes, as well as any processing parameters or algorithms.

Figure 2:
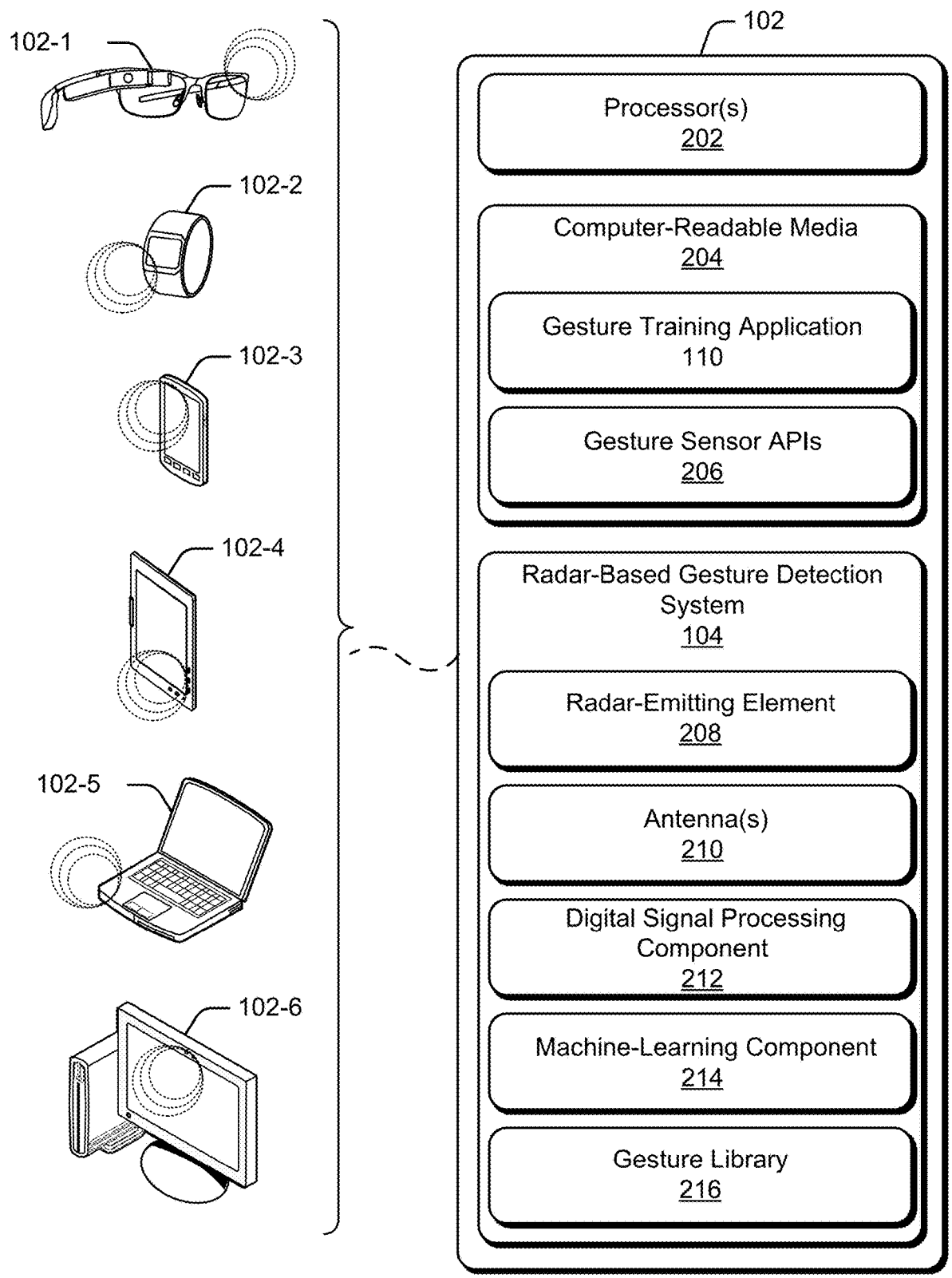
FIG. 2 illustrates an example implementation of a computing device of FIG. 1 in greater detail in accordance with one or more embodiments.

Having generally described an environment in which wireless hand gesture detection may be implemented, now consider FIG. 2, which illustrates an example implementation of computing device 102 of FIG. 1 in greater detail. As discussed herein, computing device 102 represents any suitable type of computing device in which various embodiments can be implemented. In this example, various devices include, by way of example and not limitation: smart glasses 102-1, smart watch 102-2, mobile phone 102-3, tablet 102-4, laptop 102-5, and display monitor 102-6. It is to be appreciated that these are merely examples for illustrative purposes, and that any other suitable type of computing device can be utilized without departing from the scope of the claimed subject matter, such as a gaming console, a lighting system, an audio system, a refrigerator, a microwave, etc.

Computing device 102 includes processor(s) 202 and computer-readable media 204. Gesture training application 110 from FIG. 1 and/or an operating system (not shown) embodied as computer-readable instructions on the computer-readable media 204 can be executed by the processor(s) 202 to invoke or interface with some or all of the functionalities described herein, such as through gesture sensor Application Programming Interfaces (APIs) 206.

Gesture sensor APIs 206 provide programming access into various routines and functionality incorporated into radar-based gesture detection component 104. For instance, radar-based gesture detection component 104 can have a programmatic interface (socket connection, shared memory, read/write registers, hardware interrupts, etc.) that can be used in concert with gesture sensor APIs 206 to allow applications external to radar-based gesture detection component 104 a way to communicate or configure the component. In some embodiments, gesture sensor APIs 206 provide high-level access into radar-based gesture detection component 104 in order to abstract implementation details and/or hardware access from a calling program, request notifications related to identified events, query for results, and so forth. Gesture sensor APIs 206 can also provide low-level access to radar-based gesture detection component 104, where a calling program can control direct or partial hardware configuration of radar-based gesture detection component 104. In some cases, gesture sensor APIs 206 provide programmatic access to input configuration parameters that configure transmit signals (e.g., signals 108 of FIG. 1) and/or select gesture recognition algorithms. These APIs enable programs, such as gesture training application 110, to incorporate the functionality provided by radar-based gesture detection component 104 into executable code. For instance, gesture training application 110 can call or invoke gesture sensor APIs 206 to register for, or request, an event notification when a particular micro-gesture has been detected, enable or disable wireless gesture recognition in computing device 102, and so forth. At times, gesture sensor APIs 206 can access and/or include low level hardware drivers that interface with hardware implementations of radar-based gesture detection component 104. Alternately or additionally, gesture sensor APIs 206 can be used to access various algorithms that reside on radar-based gesture detection component 104 to configure algorithms, extract additional information (such as 3D tracking information, angular extent, reflectivity profiles from different aspects, correlations between transforms/features from different channels, etc.), change an operating mode of radar-based gesture detection component 104, and so forth.

Radar-based gesture detection component 104 represents functionality that wirelessly detects gestures performed by a hand. Radar-based gesture detection component 104 can be implemented as a chip embedded within computing device 102, such as a System-on-Chip (SoC). However, it is to be appreciated that gesture sensor component can be implemented in any other suitable manner, such as one or more Integrated Circuits (ICs), as a processor with embedded processor instructions or configured to access processor instructions stored in memory, as hardware with embedded firmware, a printed circuit board with various hardware components, or any combination thereof. Here, radar-based gesture detection component 104 includes radar-emitting element 208, antenna(s) 210, digital signal processing component 212, machine-learning component 214, and gesture library 216, which can be used in concert to wirelessly detect hand gestures using radar techniques.

Generally, radar-emitting element 208 is configured to provide a radar field. In some cases, the radar field is configured to at least partially reflect off a target object. The radar field can also be configured to penetrate fabric or other obstructions and reflect from human tissue. These fabrics or obstructions can include wood, glass, plastic, cotton, wool, nylon and similar fibers, and so forth, while reflecting from human tissues, such as a person's hand.

A radar field can be a small size, such as 0 or 1 millimeters to 1.5 meters, or an intermediate size, such as 1 to 30 meters. It is to be appreciated that these sizes are merely for discussion purposes, and that any other suitable range can be used. When the radar field has an intermediate size, radar-based gesture detection component 104 is configured to receive and process reflections of the radar field to provide large-body gestures based on reflections from human tissue caused by body, arm, or leg movements. In other cases, the radar field can be configured to enable radar-based gesture detection component 104 to detect smaller and more-precise gestures, such as micro-gestures. Example intermediate-sized radar fields include those in which a user makes gestures to control a television from a couch, change a song or volume from a stereo across a room, turn off an oven or oven timer (a near field would also be useful here), turn lights on or off in a room, and so forth. Radar-emitting element 208 can be configured to emit continuously modulated radiation, ultra-wideband radiation, or sub-millimeter-frequency radiation.

Antenna(s) 210 transmit and receive RF signals. In some cases, radar-emitting element 208 couples with antenna(s) 210 to transmit a radar field. As one skilled in the art will appreciate, this is achieved by converting electrical signals into electromagnetic waves for transmission, and vice versa for reception. Radar-based gesture detection component 104 can include any suitable number of antennas in any suitable configuration. For instance, any of the antennas can be configured as a dipole antenna, a parabolic antenna, a helical antenna, a monopole antenna, and so forth. In some embodiments, antenna(s) 210 are constructed on-chip (e.g., as part of an SoC), while in other embodiments, antenna(s) 210 are separate components, metal, hardware, etc. that attach to, or are included within, radar-based gesture detection component 104. An antenna can be single-purpose (e.g., a first antenna directed towards transmitting signals, a second antenna directed towards receiving signals, etc.), or multi-purpose (e.g., an antenna is directed towards transmitting and receiving signals). Thus, some embodiments utilize varying combinations of antennas, such as an embodiment that utilizes two single-purpose antennas directed towards transmission in combination with four single-purpose antennas directed towards reception. The placement, size, and/or shape of antenna(s) 210 can be chosen to enhance a specific transmission pattern or diversity scheme, such as a pattern or scheme designed to capture information about a micro-gesture performed by the hand. In some cases, the antennas can be physically separated from one another by a distance that allows radar-based gesture detection component 104 to collectively transmit and receive signals directed to a target object over different channels, different radio frequencies, and different distances. In some cases, antenna(s) 210 are spatially distributed to support triangulation techniques, while in others the antennas are collocated to support beamforming techniques. While not illustrated, each antenna can correspond to a respective transceiver path that physically routes and manages the outgoing signals for transmission and the incoming signals for capture and analysis.

Digital signal processing component 212 generally represents digitally capturing and processing a signal. For instance, digital signal processing component 212 samples analog RF signals received by antenna(s) 210 to generate digital samples that represents the RF signals, and then processes these samples to extract information about the target object. Alternately or additionally, digital signal processing component 212 controls the configuration of signals generated and transmitted by radar-emitting element 208 and/or antenna(s) 210, such as configuring a plurality of signals to form a specific diversity scheme like a beamforming diversity scheme. In some cases, digital signal processing component 212 receives input configuration parameters that control an RF signal's transmission parameters (e.g., frequency channel, power level, etc.), such as through gesture sensor APIs 206. In turn, digital signal processing component 212 modifies the RF signal based upon the input configuration parameter. At times, the signal processing functions of digital signal processing component 212 are included in a library of signal processing functions or algorithms that are also accessible and/or configurable via gesture sensor APIs 206. Thus, digital signal processing component 212 can be programmed or configured via gesture sensor APIs 206 (and a corresponding programmatic interface of radar-based gesture detection component 104) to dynamically select algorithms and/or dynamically reconfigure. Digital signal processing component 212 can be implemented in hardware, software, firmware, or any combination thereof.

Among other things, machine-learning component 214 receives information processed or extracted by digital signal processing component 212, and uses that information to classify or recognize various aspects of the target object. In some cases, machine-learning component 214 applies one or more algorithms to probabilistically determine which gesture has occurred given an input signal and previously learned gesture features. As in the case of digital signal processing component 212, machine-learning component 214 can include a library of multiple machine-learning algorithms, such as a Random Forest algorithm, deep learning algorithms (e.g., artificial neural network algorithms, convolutional neural net algorithms, etc.), clustering algorithms, Bayesian algorithms, and so forth. Machine-learning component 214 can be trained on how to identify various gestures using input data that consists of example gesture(s) to learn. In turn, machine-learning component 214 uses the input data to learn what features can be attributed to a specific gesture. These features are then used to identify when the specific gesture occurs. In some embodiments, gesture sensor APIs 206 can be used to configure machine-learning component 214 and/or its corresponding algorithms. Thus, machine-learning component 214 can be configured via gesture sensor APIs 206 (and a corresponding programmatic interface of radar-based gesture detection component 104) to dynamically select algorithms and/or dynamically reconfigure.

Gesture library 216 represents data used by digital signal processing component 212 and/or machine-learning component 214 to identify a target object and/or detect known gestures performed by the target object. For instance, gesture library 216 can store signal characteristics, characteristics about a target object that are discernable from a signal, or a customized machine-learning model that can be used to identify a unique in-the-air gesture, a user identity, user presence, and so forth. In addition, certain data stored in gesture library 216 may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Having described computing device 102 in accordance with one or more embodiments, now consider a discussion of RF signal propagation in radar-based detection devices in accordance with one or more embodiments.

RF Signal Propagation in Radar-Based Detection Devices

As technology advances, users have an expectation that new devices will provide additional freedoms and flexibility over past devices. One such example is the inclusion of wireless capabilities in a device. Consider the case of a wireless mouse input device. A wireless mouse input device receives input from a user in the format of button clicks and movement in position, and wirelessly transmits this information to a corresponding computing device. The wireless nature obviates the need to have a wired connection between the wireless mouse input device and the computing device, which gives more freedom to the user with the mobility and placement of the mouse. However, the user still physically interacts with the wireless mouse input device as a way to enter input into the computing device. Accordingly, if the wireless mouse input device gets lost or is misplaced, the user is unable to enter input with that mechanism. Thus, removing the need for a peripheral device as an input mechanism gives additional freedom to the user. One such example is performing input to a computing device via a hand gesture.

Hand gestures provide a user with a simple and readily available mechanism to input commands to a computing device. However, detecting hand gestures can pose certain problems. For example, attaching a movement sensing device to a hand does not remove a user's dependency upon a peripheral device. Instead, it is a solution that trades one input peripheral for another. As an alternative, cameras can capture images, which can then be compared and analyzed to identify the hand gestures. However, this option may not yield a fine enough resolution to detect micro-gestures. An alternate solution involves usage of radar systems to transmit a radar field to a target object, and determine information about that target based upon an analysis of the reflected signal.

Figure 3:
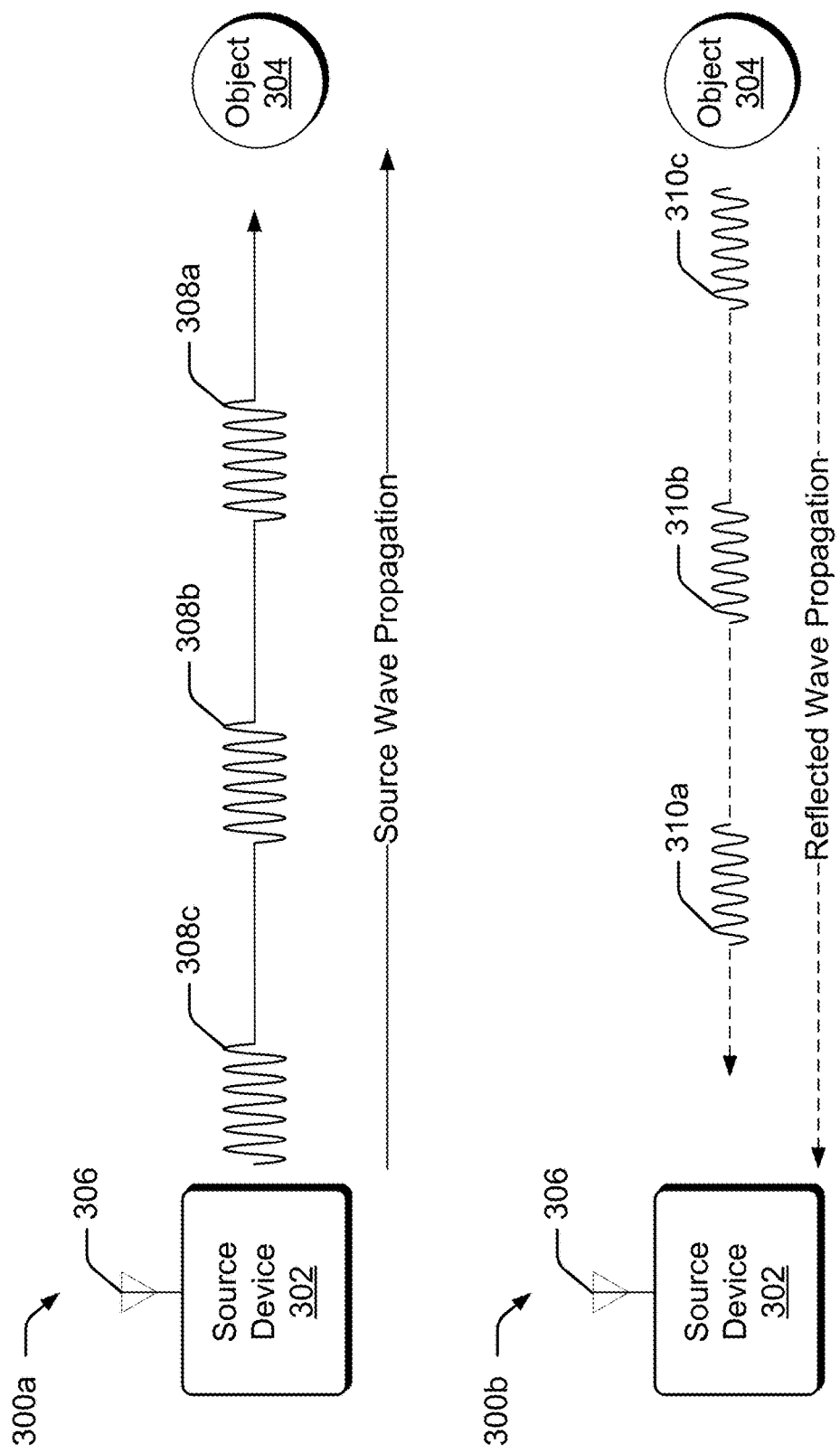
FIG. 3 illustrates an example of general signal properties.

Consider FIG. 3 which illustrates a simple example of RF wave propagation, and a corresponding reflected wave propagation. It is to be appreciated that the following discussion has been simplified, and is not intended to describe all technical aspects of RF wave propagation, reflected wave propagation, or detection techniques.

Environment 300a includes source device 302 and object 304. Source device 302 includes antenna 306, which generally represents functionality configured to transmit and receive electromagnetic waves in the form of an RF signal. It is to be appreciated that antenna 306 can be coupled to a feed source, such as a radar-emitting element, to achieve transmission of a signal. In this example, source device 302 transmits a series of RF pulses, illustrated here as RF pulse 308a, RF pulse 308b, and RF pulse 308c. As indicated by their ordering and distance from source device 302, RF pulse 308a is transmitted first in time, followed by RF pulse 308b, and then RF pulse 308c. For discussion purposes, these RF pulses have the same pulse width, power level, and transmission periodicity between pulses, but any other suitable type of signal with alternate configurations can be transmitted without departing from the scope of the claimed subject matter.

Generally speaking, electromagnetic waves can be characterized by the frequency or wavelength of their corresponding oscillations. Being a form of electromagnetic radiation, RF signals adhere to various wave and particle properties, such as reflection. When an RF signal reaches an object, it will undergo some form of transition. Specifically, there will be some reflection off the object. Environment 300b illustrates the reflection of RF pulses 308a-308c reflecting off of object 304, where RF pulse 310a corresponds to a reflection originating from RF pulse 308a reflecting off of object 304, RF pulse 310b corresponds to a reflection originating from RF pulse 308b, and so forth. In this simple case, source device 302 and object 304 are stationary, and RF pulses 308a-308c are transmitted via a single antenna (antenna 306) over a same RF channel, and are transmitted directly towards object 304 with a perpendicular impact angle. Similarly, RF pulses 310a-310c are shown as reflecting directly back to source device 302, rather than with some angular deviation. However, as one skilled in the art will appreciate, these signals can alternately be transmitted or reflected with variations in their transmission and reflection directions based upon the configuration of source device 302, object 304, transmission parameters, variations in real-world factors, and so forth. Upon receiving and capturing RF pulses 310a-310c, source device 302 can then analyze the pulses, either individually or in combination, to identify characteristics related to object 304. For example, source device 302 can analyze all of the received RF pulses to obtain temporal information and/or spatial information about object 304. Accordingly, source device 302 can use knowledge about a transmission signal's configuration (such as pulse widths, spacing between pulses, pulse power levels, phase relationships, and so forth), and further analyze a reflected RF pulse to identify various characteristics about object 304, such as size, shape, movement speed, movement direction, surface smoothness, material composition, and so forth.

Figure 4:
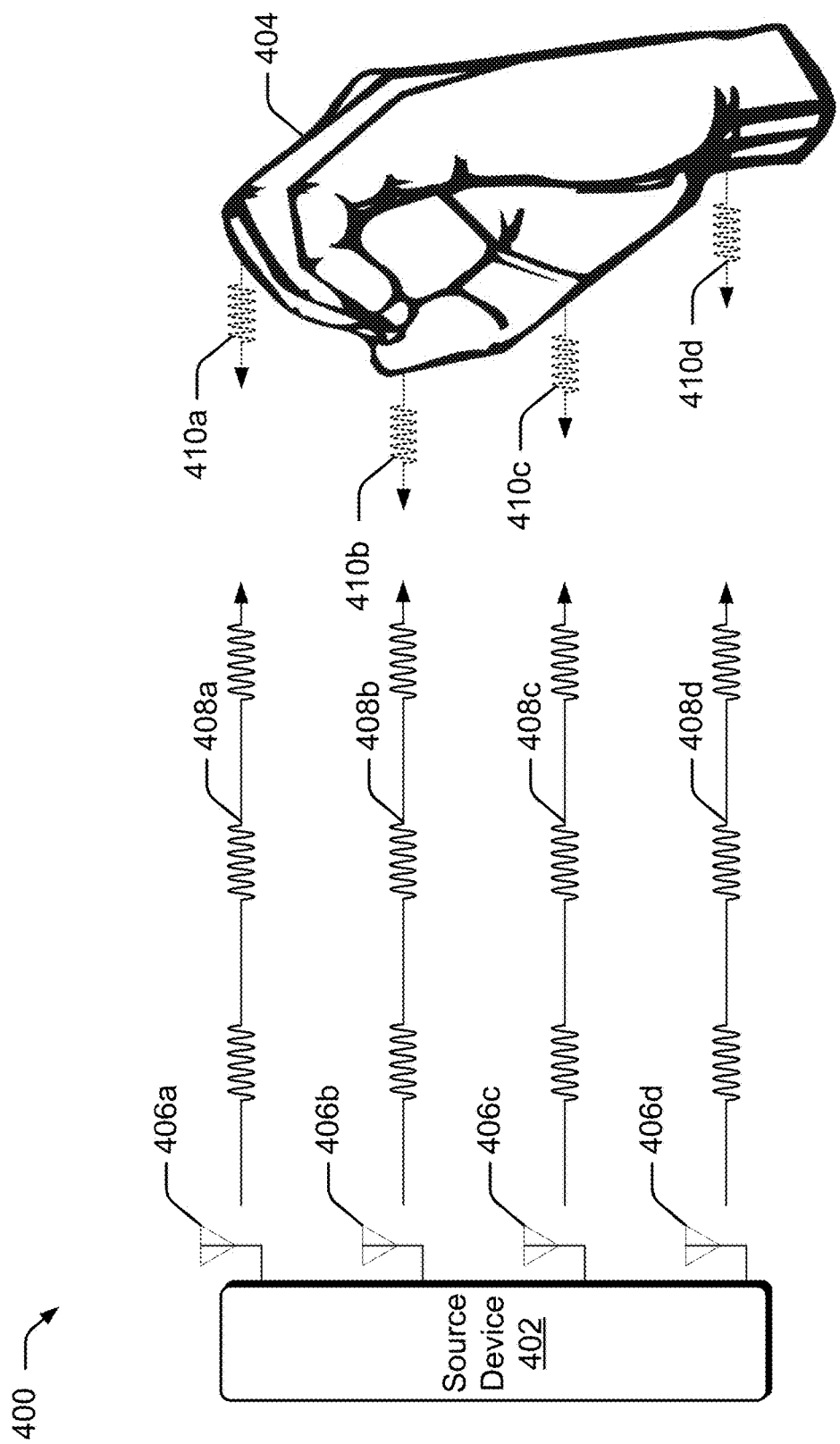
FIG. 4 illustrates another example of general signal properties.

Now consider FIG. 4, which builds upon the discussion of FIG. 3. FIG. 4 illustrates example environment 400 in which multiple antenna are used to ascertain information about a target object. Environment 400 includes source device 402 and a target object, shown here as hand 404. Generally speaking, source device 402 includes antennas 406a-406d to transmit and receive multiple RF signals. In some embodiments, source device 402 includes radar-based gesture detection component 104 of FIG. 1 and FIG. 2, and antennas 406a-406d correspond to antenna(s) 210. While source device 402 in this example includes four antennas, it is to be appreciated that any suitable number of antennas can be used. Each antenna of antennas 406a-406d is used by source device 402 to transmit a respective RF signal (e.g., antenna 406a transmits RF signal 408a, antenna 406b transmits RF signal 408b, and so forth). As discussed herein, these RF signals can be configured to form a specific transmission pattern or diversity scheme when transmitted together. For example, the configuration of RF signals 408a-408d, as well as the placement of antennas 406a-406d relative to a target object, can be based upon beamforming techniques to produce constructive interference or destructive interference patterns, or alternately configured to support triangulation techniques. At times, source device 402 configures RF signals 408a-408d based upon an expected information extraction algorithm, as further described below.

When RF signals 408a-408d reach hand 404, they generate reflected RF signals 410a-410d. Similar to the discussion of FIG. 3, source device 402 captures these reflected RF signals, and then analyzes them to identify various properties or characteristics of hand 404, such as a micro-gesture. For instance, in this example, RF signals 408a-408d are illustrated with the bursts of the respective signals being transmitted synchronously in time. In turn, and based upon the shape and positioning of hand 404, reflected signals 410a-410d return to source device 402 at different points in time (e.g., reflected signal 410b is received first, followed by reflected signal 410c, then reflected signal 410a, and then reflected signal 410d). Reflected signals 410a-410d can be received by source device 402 in any suitable manner. For example, antennas 406a-406d can each receive all of reflected signals 410a-410d, or receive varying subset combinations of reflected signals 410a-410d (e.g., antenna 406a receives reflected signal 410a and reflected signal 410d, antenna 406b receives reflected signal 410a, reflected signal 410b, and reflected signal 410c, etc.). Thus, each antenna can receive reflected signals generated by transmissions from another antenna. By analyzing the various return times of each reflected signal, source device 402 can determine shape and corresponding distance information associated with hand 404. When reflected pulses are analyzed over time, source device 402 can additionally discern movement. Thus, by analyzing various properties of the reflected signals, as well as the transmitted signals, various information about hand 404 can be extracted, as further described below. It is to be appreciated that this example has been simplified for discussion purposes, and is not intended to be limiting.

As in the case of FIG. 3, FIG. 4 illustrates RF signals 408a-408d as propagating at a 90° angle from source device 402 and in phase with one another. Similarly, reflected signals 410a-410d each propagate back at a 90° angle from hand 404 and, as in the case of RF signals 408a-408d, are in phase with one another. However, as one skilled in the art will appreciate, more complex transmission signal configurations, and signal analysis on the reflected signals, can be utilized, examples of which are provided herein. In some embodiments, RF signals 408a-408d can each be configured with different directional transmission angles, signal phases, power levels, modulation schemes, RF transmission channels, and so forth. These differences result in variations between reflected signals 410a-410d. In turn, these variations each provide different perspectives of the target object which can be combined using data fusion techniques to yield a better estimate of hand 404, how it is moving, its 3-dimentional (3D) spatial profile, a corresponding micro-gesture, etc.

Figure 5:
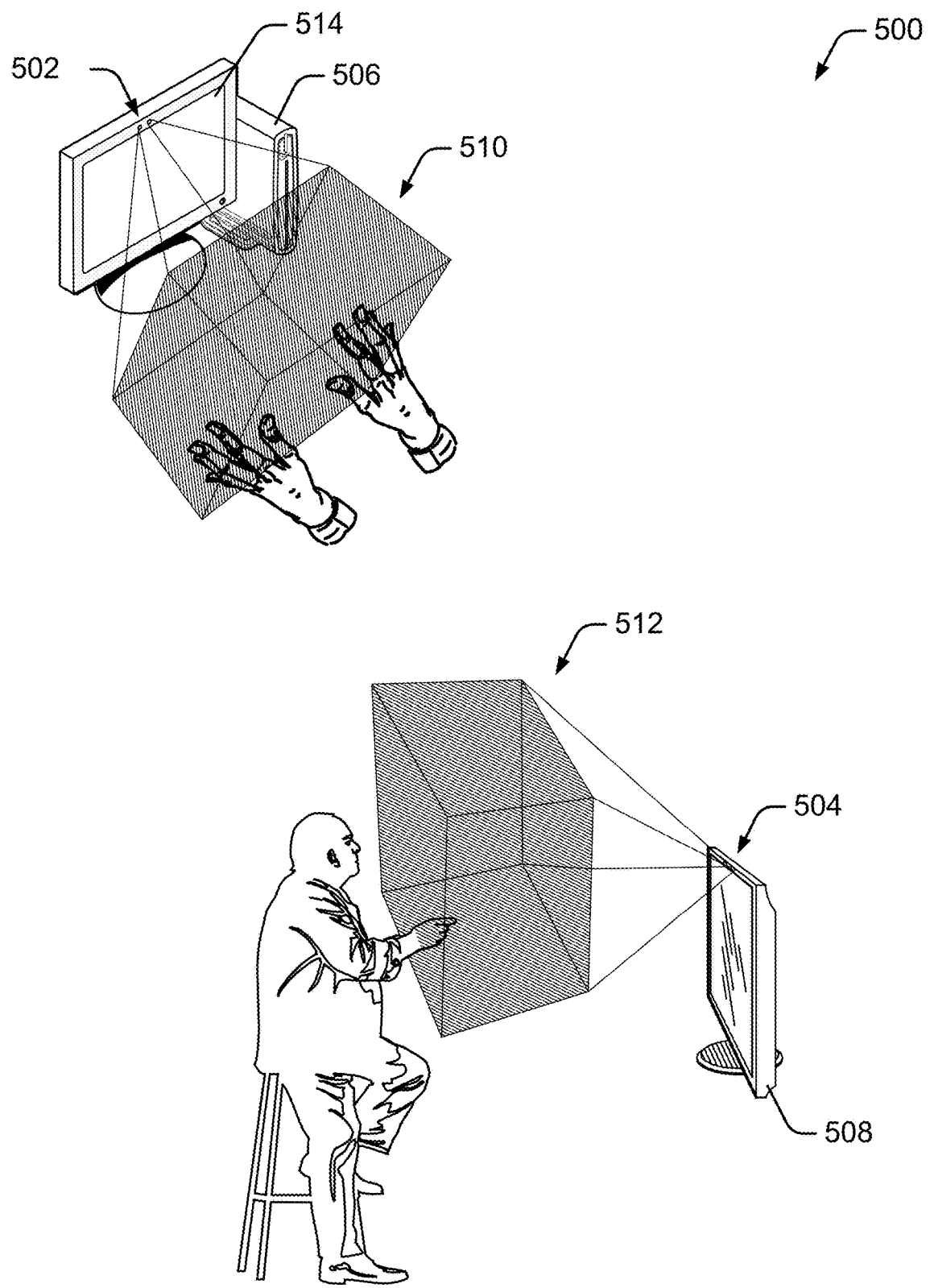
FIG. 5 illustrates an example environment that employs user-customizable input gestures in accordance with one or more embodiments.

Now consider FIG. 5, which illustrates example environment 500 in which techniques using, and an apparatus including, a radar-based gesture recognition system may be embodied, such as radar-based gesture detection component 104 of FIG. 1. Environment 500 includes two example devices using a radar-based gesture detection system. In the first, radar-based gesture detection system 502 provides a near radar field to interact with desktop computer 506, and in the second, radar-based gesture detection system 504 provides an intermediate radar field (e.g., a room size) to interact with television 508. These radar-based gesture detection systems 502 and 504 provide radar field 510 and intermediate radar field 512, respectively, and are described below.

Desktop computer 506 includes, or is associated with, radar-based gesture detection system 502. These devices work together to improve user interaction with desktop computer 506. Assume, for example, that desktop computer 506 includes a touch screen 514 through which display and user interaction can be performed. This touch screen 514 can present some challenges to users, such as needing a person to sit in a particular orientation, such as upright and forward, to be able to touch the screen. Further, the size for selecting controls through touch screen 514 can make interaction difficult and time-consuming for some users. Consider, however, radar-based gesture detection system 502, which provides near radar field 510 enabling a user's hands to interact with desktop computer 506, such as with small or large, simple or complex gestures, including those with one or two hands, and in three dimensions. As is readily apparent, a large volume through which a user may make selections can be substantially easier and provide a better experience over a flat surface, such as that of touch screen 514.

Similarly, consider radar-based gesture detection system 504, which provides intermediate radar field 512. Providing a radar-field enables a user to interact with television 508 from a distance and through various gestures, ranging from hand gestures, to arm gestures, to full-body gestures. By so doing, user selections can be made simpler and easier than a flat surface (e.g., touch screen 514), a remote control (e.g., a gaming or television remote), and other conventional control mechanisms.

Radar-based gesture recognition systems can interact with applications or an operating system of computing devices, or remotely through a communication network by transmitting input responsive to recognizing gestures. Gestures can be mapped to various applications and devices, thereby enabling control of many devices and applications. Many complex and unique gestures can be recognized by radar-based gesture recognition systems, thereby permitting precise and/or single-gesture control, even for multiple applications. Radar-based gesture recognition systems, whether integrated with a computing device, having computing capabilities, or having few computing abilities, can each be used to interact with various devices and applications.

Figure 6:
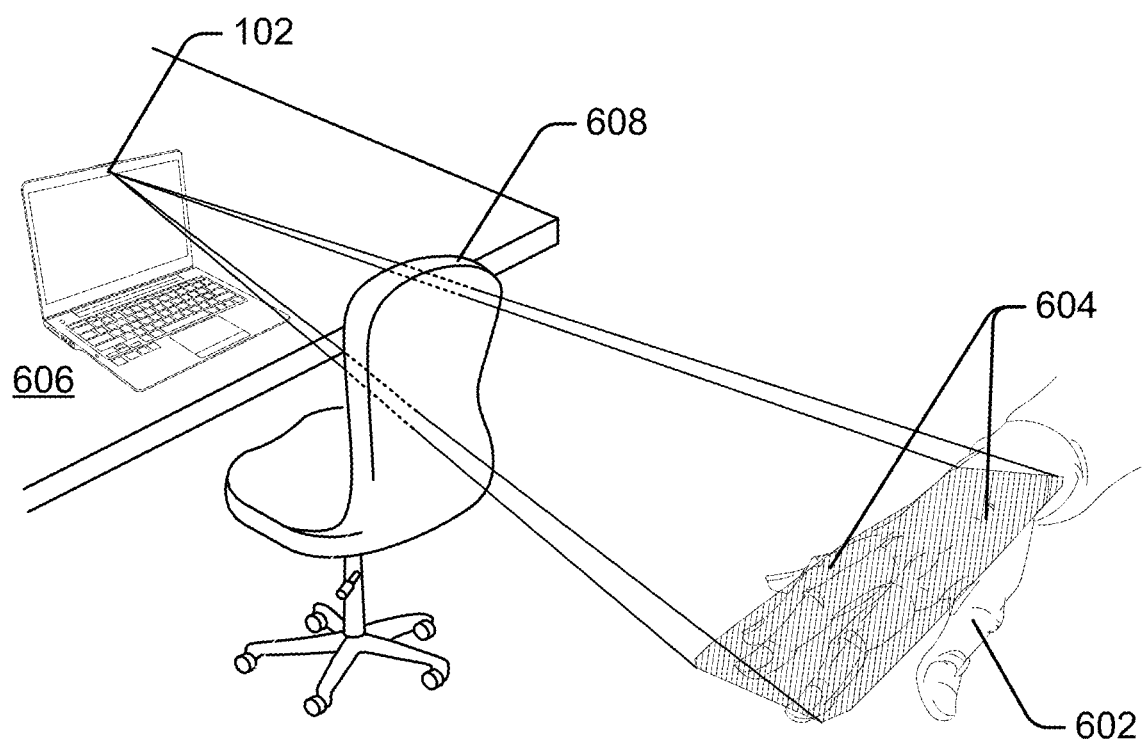
FIG. 6 illustrates an example environment that employs user-customizable input gestures in accordance with one or more embodiments.

The radar field can also include a surface applied to human tissue. This is illustrated at FIG. 6, which shows hand 602 having a surface radar field 604 provided by radar-based gesture recognition component 104 (of FIGS. 1 and 2) that is include in laptop 606. Radar-emitting element 208 (not shown) provides surface radar field 604 penetrating chair 608 and applied to hand 602. In this case, antenna(s) 210 (not shown) is configured to receive a reflection caused by an interaction on the surface of hand 602 that penetrates (e.g., reflects back through) chair 608. Similarly, digital signal processing component 212 and/or machine-learning component 214 are configured to process the received reflection on the surface sufficient to provide gesture data usable to determine a gesture. Note that with surface radar field 604, another hand may interact to perform gestures, such as to tap on the surface on hand 602, thereby interacting with surface radar field 604. Example gestures include single and multi-finger swipe, spread, squeeze, non-linear movements, and so forth. Hand 602 may move or change shape to cause reflections, thereby also performing an occluded gesture.

With respect to human-tissue reflection, reflecting radar fields can process these fields to determine identifying indicia based on the human-tissue reflection, and confirm that the identifying indicia matches recorded identifying indicia for a person, such as authentication for a person permitted to control a corresponding computing device. These identifying indicia can include various biometric identifiers, such as a size, shape, ratio of sizes, cartilage structure, and bone structure for the person or a portion of the person, such as the person's hand. These identify indicia may also be associated with a device worn by the person permitted to control the mobile computing device, such as device having a unique or difficult-to-copy reflection (e.g., a wedding ring of 14 carat gold and three diamonds, which reflects radar in a particular manner). In addition, radar-based gesture detection systems can be configured so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Having described general principles of RF signals which can be used in radar-based detection devices, now consider a discussion of user-customizable input gestures that can be employed in accordance with one or more embodiments.

User-Customized Input Gestures

As discussed herein, a radar-based gesture detection system provides a user with a way to enter input into a computing device without physically touching the computing device, or an input mechanism coupled to the computing device. As the user performs an in-the-air gesture, the radar-based gesture detection system uses reflected signals to extract characteristics about the gesture that are then used to identify and recognize the gesture. In turn, this gesture can generally be mapped to a known input and/or have additional input context associated with an application. For instance, the radar-based gesture detection system can consult a gesture library, such as gesture library 216 of FIG. 2, to map the extracted characteristics to a known gesture and/or input. Provided the user is able to perform the gesture that corresponds to the known input, they can interact with the computing device. Sometimes, however, the user either cannot perform the default input gesture, or desires to use a new gesture only known to themselves for security purposes.

Various embodiments dynamically learn user-customizable input gestures. Instead of using known gestures, or creating new combinations of known gestures, to replace a default gesture associated with invoking an action, a radar-based gesture detection system learns a new gesture that was previously unknown to the radar-based gesture detection system. At times, a software package or tool provides the user with a simplified or user-friendly interface to train the radar-based gesture detection system with a new input gesture.

Figure 7:
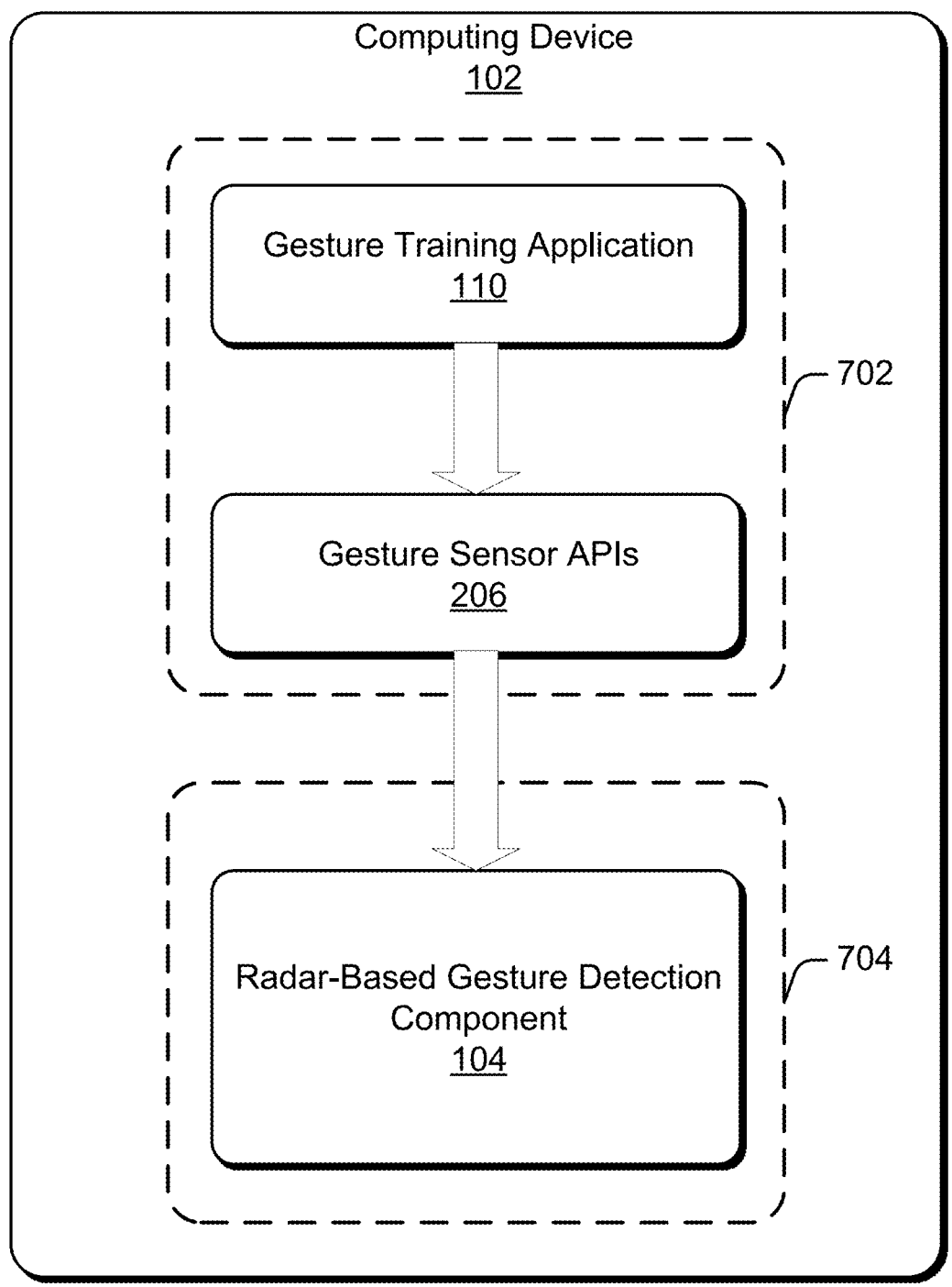
FIG. 7 illustrates an example device configured to dynamically learn a new input gesture in accordance with one or more embodiments.

FIG. 7 illustrates another example of computing device 102 from FIG. 1. Here, computing device 102 has been generally partitioned into two sections: software partition 702 and hardware partition 704, which are each outlined with a respective rectangle. For discussion purposes, components residing within software partition 702 can generally be considered software implementations and components residing within hardware partition 704 can be considered hardware components. The term generally is used to indicate a simplification in the illustration. Thus, it is to be appreciated that a software implementation may additionally include, or be embodied on, hardware, such as computer-readable media, in which to store processor-executable instructions and/or a processor which executes the processor executable instructions. Similarly, a hardware implementation may additionally include firmware or programmable logic. In this example, software partition 702 includes gesture training application 110 from FIG. 1 and gesture sensor APIs 206 from FIG. 2, while hardware partition 704 includes radar-based gesture detection component 104 from FIG. 1. Further, while components are described here in the context of being a software module or a hardware component, other embodiments can implement these in varying combinations of hardware, software, firmware, and so forth, without departing from the scope of the claimed subject matter.

Among other things, gesture training application 110 represents a software package and/or software tool that provides an interface to the user for customizing input gestures to a radar-based gesture detection system. In some embodiments, gesture training application 110 includes a user's guide that explains a training process, such as high-level steps used to train radar-based gesture detection component 104. Here, high-level instructions indicate instructions or interface controls that obscure hardware configuration and/or algorithm configurations from the user. For example, high level instructions can include simple steps such as "Step 1: Enable gesture detection by activating the user interface control labeled 'Start Gesture Training', Step 2: Perform an in-the-air gesture, and Step 3: Assign an action to the captured gesture". As one skilled in the art will appreciate, these three steps are considered high-level in that the user does not need to have any knowledge on how these steps are performed in hardware or by computing device 102. In other cases, the user's guide includes low-level instructions that indicate to a user hardware-specific instructions, such as "Step 1: Set up the radar field transmission parameters by writing data into the radar configuration register, Step 2: Program a machine-learning algorithm by writing data into the machine-learning register, Step 3: Program digital signal processing capture parameters by writing data into the digital signal processing register", and so forth. Thus, the user's guide can include simple, high-level instructions that describe steps which obscure hardware configuration information from user, to low-level instructions that explain hardware level access and configuration steps to a user. Alternately or additionally, the user's guide can include a questionnaire as a way to determine how to configure a radar-based gesture detection component 104. For example, the questionnaire can ask whether the pending new gesture is a micro-gesture, or something larger. In turn, the answers can affect what radar field is emitted for learning a new gesture, what digital signal processing configurations or algorithms are used to learn a new gesture, what machine-learning algorithm is applied to learn a new gesture, how many iterations of the gesture are captured, and so forth.

Gesture training application 110 selects and configures various digital signal processing components and/or machine-learning components included within radar-based gesture detection component 104, such as digital signal processing component 212 and machine-learning component 214 (which are not illustrated in FIG. 7). This can be achieved using the programmatic access provided by gesture sensor APIs 206. Similar to that described with respect to the user's guide, the gesture sensor APIs can provide high-level access or low-level access. High-level access enables gesture training application 110 to invoke a single API associated with transitioning the radar-based gesture detection component into a gesture-learning mode, and having the radar-based gesture detection component automatically completing the process to learn the new gesture (e.g., configured to complete the gesture learning process without any further input from the user), while low-level access APIs give gesture-learning applications 706 the ability to select or configure the radar fields that are transmitted, the digital signal processing parameters utilized, the machine-learning algorithms applied, what actions are performed when for learning a new gesture, and so forth. For example, consider a pipeline implementation in which each stage of the pipeline receives an input, and analyzes or generates new information from that input. Some embodiments use a pipeline that includes, among other things, a digital-signal processing stage and a machine-learning stage. Gesture training application 110 sometimes configures each stage with an algorithm or parameters conducive towards learning or defining a new gesture. At times the various algorithms or parameters used in a gesture training mode differ from the parameters and algorithms used to detect gestures already known to the radar-based gesture detection component.

Gesture training application 110 sometimes displays visual prompts to a user as part of the gesture training process. For example, the gesture-learning application can include display controls that a user selects to train the radar-based gesture detection component on a new in-the-air gesture. In some cases, the display control can be a start button that the user selects, or an in-the-air gesture associated with initiating a gesture learning mode. As previously discussed, this simple interface obscures from the user any configuration performed on the radar-based gesture detection component as part of the training process. However, the user may need prompts to aid in the process, such as a visual prompt that indicates when to perform a new gesture, when to repeat performing the new gesture, and when to stop performing the new gesture. These visual prompts can also indicate whether the training period was successful, an update or a percentage of completion in the training process, when radar is actively being emitted, and so forth. Alternately or additionally, visual prompts can be used to display instructions on how assign the newly learned gesture to a function, action, as a password, etc.

Based upon the interactions with gesture training application 110, radar-based gesture detection component 104 has the ability learn new in-the-air gestures that are previously unknown to the system. When in a gesture-learning mode, the radar-based gesture detection system may operate in a different manner than when detecting in-the-air gestures. For example, when in the gesture-learning mode, the radar-based gesture detection system records training data. This training data can be representative of a single capture of a new gesture that is being analyzed, or can be representative of multiple captures. The training data may be stored for future reference, or thrown away. Regardless, training data can be input to a machine-learning algorithm (such as one utilized by machine-learning component 214) as a way to build a new model subsequently used to identify the new gesture when it is next performed. In some embodiments, the training data is raw signal captures, while in other embodiments, the training data is information extracted by a digital signal processing component (such as digital signal processing component 212), including the non-limiting examples of a 3D profile, target velocity information, target directional movement information, and so forth. Thus, a machine-learning process may receive transformed data or extracted data, rather than raw signal data. Upon learning a new gesture, the radar-based gesture detection component can be updated to identify the new gesture in the future by storing identifying characteristic and/or storing a newly generated model for future reference and detection purposes.

Figure 8:
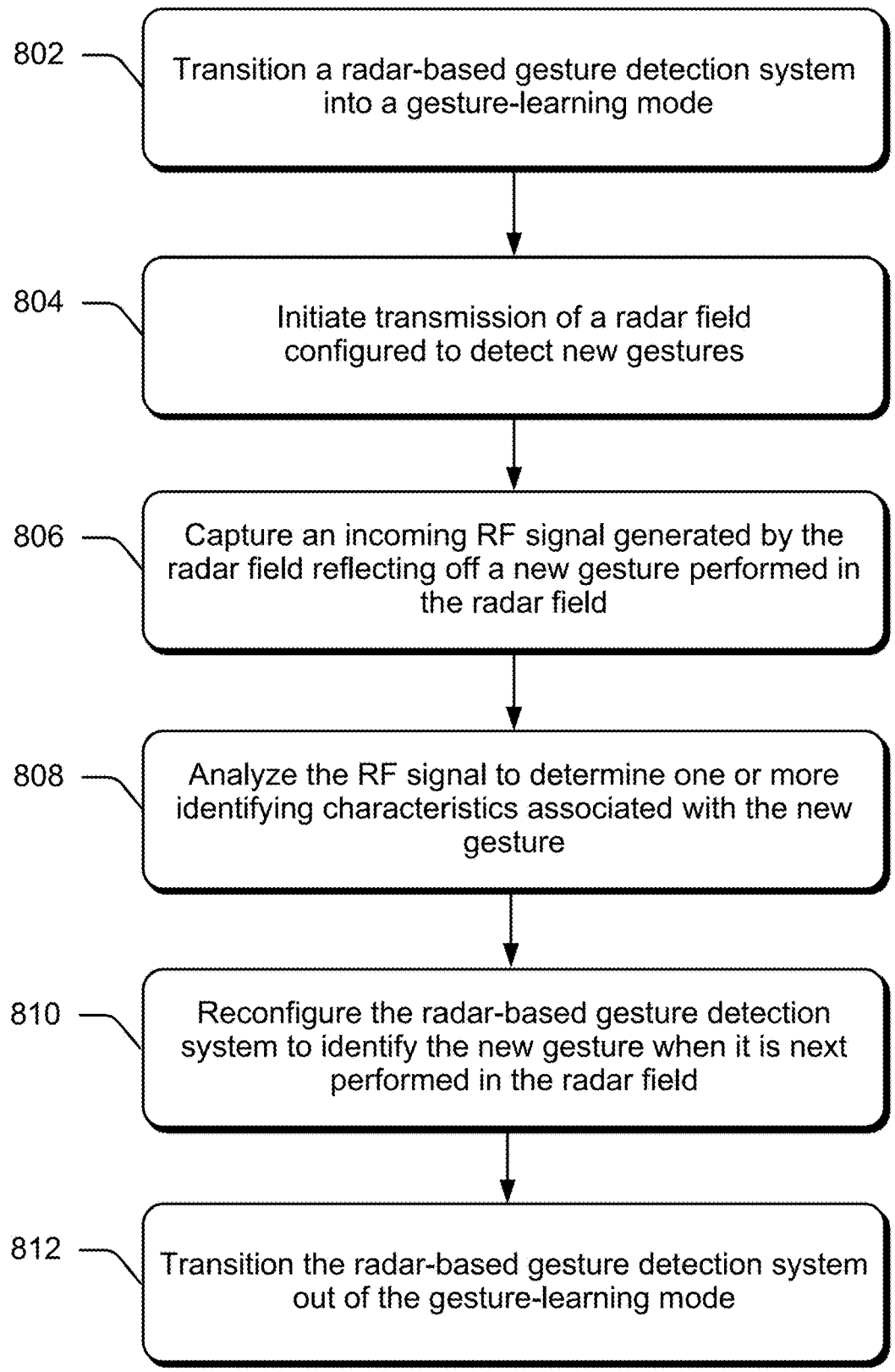
FIG. 8 illustrates an example flow diagram in accordance with one or more embodiments.

FIG. 8 is a flow diagram that describes steps in a method for dynamically learning a gesture in accordance with one or more embodiments. The method can be implemented in connection with any suitable hardware, software, firmware, or combination thereof. In at least some embodiments, the method can be implemented by a suitably-configured system, such radar-based gesture detection component 104 and/or gesture training application 110 of FIGS. 1 and 2.

Step 802 transitions a radar-based gesture detection system into a gesture-learning mode. This can be user initiated, such as a user selecting a hardware button connected to the radar-based gesture detection system that, when activated, transitions the radar-based gesture detection system into a gesture-learning mode. In other embodiments, the user performs an in-the-air gesture associated with initiating the gesture training process, or selects a control displayed on a user-interface of a gesture training application. Upon receiving input from the user, whether through a display control or an in-the-air gesture, the gesture training application programmatically communicates with the radar-based gesture detection system as a way to dynamically initiate a gesture-learning process. Some embodiments provide the gesture training application with APIs that transition the radar-based gesture detection system into the gesture-learning mode. Alternately or additionally, commands are sent a radar-based gesture detection system via a programmatic interface to configure various internal components, such as digital signal processing component 212 and/or machine-learning component 214 of FIG. 2.

Step 804 initiates transmission of a radar field from the radar-based gesture detection system. This can be achieved in any suitable manner. In some cases, the radar-based gesture detection system has a default radar field that is automatically transmitted when in the gesture-learning mode. In other cases, the radar field is dynamically configured based upon an anticipated gesture, or changes dynamically for some or all iterations of a training process. For example, some radar fields may have a configuration that is more suitable for detecting micro-gestures (using a near-field configuration) versus larger gestures (using an intermediate-sized radar field configuration) or location determinations. Thus, in some embodiments, when initially detecting a new gesture, for a first iteration of analysis, the radar emitter emits the radar field in a first configuration that is suitable for location detection. Upon determining a location of the new gesture and completing the analysis with the first radar field, the radar-based gesture detection system can dynamically reconfigure the radar emitter to emit the radar field in a second configuration and/or diversity scheme (in subsequent iterations of analysis) that is suitable for micro-gesture detection can be emitted for subsequent iterations of training data capture. In other embodiments, the reconfiguration process can be controlled by an external application, such as gesture training application 110 of FIG. 1. The radar field can be automatically and continuously transmitted, can transmit in bursts over pre-determined intervals of times, can have a predetermine amount of time delay before transmitting, can wait until additional user input is received to initiate transmission, and so forth. Thus, a radar field can transmit over any period of time in bursts, with delays, continuously, etc.

Step 806 captures an incoming RF signal generated by the radar field reflecting off a new gesture being performed in the radar field. As discussed herein, this can be an iterative process in which multiple captures are taken over a period of time. In some embodiments, the incoming RF signal is received by a single-purpose antenna that is directed towards receiving, while in other embodiments, the incoming RF signal is receive by a multi-purpose antenna. For example, antenna(s) 210 of FIG. 2 can be used to receive one or more reflected RF signals traveling in free space, convert them into an electromagnetic signal, and feed that signal to an ADC of digital signal processing component 212 of FIG. 2 to generate a digital capture or representation of the reflected RF signals. Here, a new gesture represents a gesture that is currently unknown by and/or is currently undefined in the radar-based gesture detection system.

Step 808 analyzes the RF signal to determine one or more identifying characteristics associated with the new gesture. Here, the analysis can be an iterative process that analyzes multiple data captures, and/or can include a multi-step process. For example, consider the example of a pipeline that includes a digital-signal processing stage and a machine-learning stage. Analyzing the RF signal can sometimes first feed a raw a digital capture of an RF signal into a digital signal processing stage as a way to transform the signal into an alternate representation (e.g., 3D representation, velocity, etc.). In turn, the alternate representation can be fed into the machine-learning stage as training data. The machine-learning stage then uses this training data to identify and learn unique characteristics about the new gesture. In some cases, the machine-learning stage uses a single set of training data to identify characteristics about the new gesture, while in other cases, multiple sets of training data are used.

Step 810 reconfigures the radar-based gesture detection system to identify the new gesture when it is next performed in the radar field. This can include dynamically generating or building a new custom machine-learning model that identifies the new or unknown gesture based upon the characteristics unique to the new gesture. A custom machine-learning model can be generated using a single data capture, or can be generated over time using multiple iterations of data capture. Some embodiments store the custom machine-learning model and/or the unique characteristics associated with the new gesture in a gesture library, such as gesture library 216 of FIG. 2. In turn, this defines the new gesture, or makes the new gesture known, to the radar-based gesture detection system.

Upon completion of the training process, step 812 transitions the radar-based gesture detection system out of the gesture-learning mode. In some cases, the transition out of the gesture-learning mode is user-initiated, in that a user interfaces with an application or the radar-based gesture detection system to indicate the training process is over. This can be achieved in any suitable manner, such as through an in-the-air gesture, a hardware button press, a user interface control selection, etc. Other times, the training process is configured to run for a predetermined amount of time or a set number of iterations. For example, upon entering the gesture-learning mode, some embodiments set a timer for a predetermined amount of time. When the timer expires, the training process completes and transitions out of the gesture-learning mode, where no more training data is captured or recorded. In the case of a predetermined number of iterations, the training process will run until "X" number of training data captures are recorded ("X" being an arbitrary number).

The various examples described generally discuss radar-based gesture detection systems in the context of learning user-customized gestures performed by a hand. However, other types or forms of gestures can be learned as well. For example, consider a case of a disabled person who is unable to perform refined movements as those performed in a micro-gesture. In such a situation, the user can dynamically modify or train the radar-based gesture detection system to learn less refined movements, unconventional movements, and/or movements less fluid or precise in execution than gestures currently known by into the radar-based detection system. For instance, a radar-based gesture detection system can discern differences in tongue gestures, which other sensors lack resolution or light for (such as cameras). Users unable to perform hand gestures can dynamically train the system to use these alternate gestures as a form of input. As another example, a user who cannot physically perform a double-tap with a finger with execution that fits within the characteristics currently defined in a radar-based detection can retrain the system to recognize a less precise version of the double-tap gesture as performed by the user when compared to the double-tap gesture currently defined to the radar detection system. Further, allowing a user to customize input gestures adds flexibility to the user experience. In the case of a radar-based gesture detection system, the user can physically demonstrate a new gesture for the system to learn. These new and previously unknown gestures can then be mapped to any suitable type of action. In turn, these new gestures can be used to enter a password to unlock a home, a car, log into a secure web site, auto-dial a specific person, order a taxi, open a mapping application and/or auto-map a route to a specific destination, and so forth. By coupling this with a gesture training application, dynamic machine-learning of a new gesture additionally gives flexibility to users of all technical capacity.

Having considered various embodiments, consider now an example system and device that can be utilized to implement the embodiments described herein.

Example Electronic Device

Figure 9:
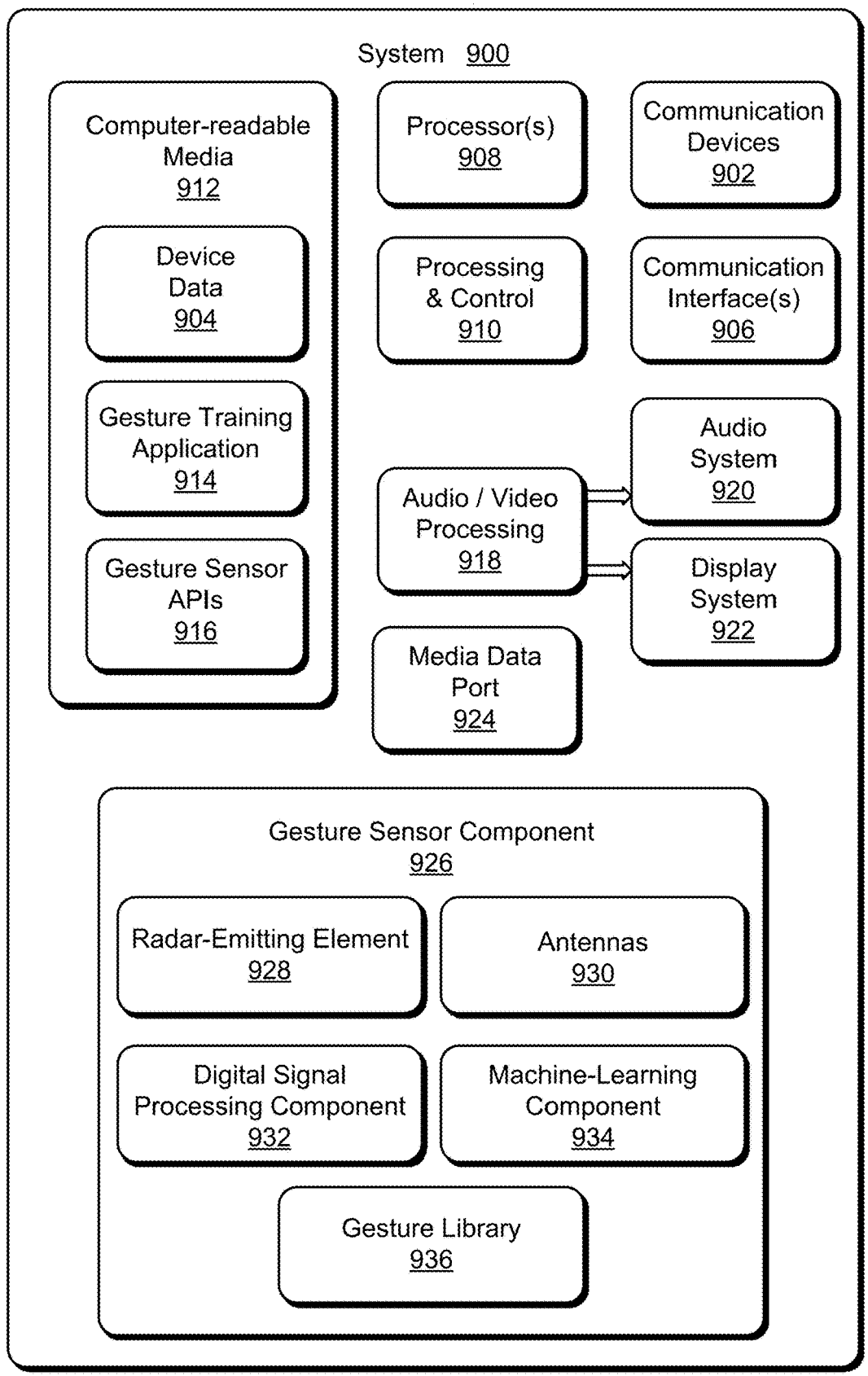
FIG. 9 illustrates an example device in which user-customizable input gestures can be employed in accordance with one or more embodiments.

FIG. 9 illustrates various components of an example system 900 that incorporates user-customizable machine-learning of gestures as described with reference to FIGS. 1-8. System 900 may be implemented as any type of a fixed or mobile device, in any form of a consumer, computer, portable, user, communication, phone, navigation, gaming, audio, camera, messaging, media playback, and/or other type of electronic device, such as computing device 102 described with reference to FIGS. 1 and 2. In some cases, system 900 can alternately be implemented as a printed circuit board (PCB), a chip-on-chip system, and so forth. In light of this, it is to be appreciated that various alternate embodiments can include additional components that are not described, or exclude components that are described, with respect to system 900.

System 900 includes communication devices 902 that enable wired and/or wireless communication of device data 904 (e.g., received data, data that is being received, data scheduled for broadcast, data packets of the data, etc.). The device data 904 or other device content can include configuration settings of the device and/or information associated with a user of the device.

System 900 also includes communication interfaces 906 that can be implemented as any one or more of a serial and/or parallel interface, a wireless interface, any type of network interface, a modem, and as any other type of communication interface. The communication interfaces 906 provide a connection and/or communication links between system 900 and a communication network by which other electronic, computing, and communication devices communicate data with system 900.

System 900 includes one or more processors 908 (e.g., any of microprocessors, controllers, and the like) which process various computer-executable instructions to control the operation of system 900 and to implement embodiments of the techniques described herein. Alternately or in addition, system 900 can be implemented with any one or combination of hardware, firmware, or fixed logic circuitry that is implemented in connection with processing and control circuits which are generally identified at 910. Although not shown, system 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

System 900 also includes computer-readable media 912, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like.

Computer-readable media 912 provides data storage mechanisms to store the device data 904, as well as various applications and any other types of information and/or data related to operational aspects of system 900. Here, computer-readable media 912 includes gesture training application 914, which generally represents an application that a user can interface with to train system 900 with new in-the-air gestures. Other applications can include a device manager (e.g., a control application, software application, signal processing and control module, code that is native to a particular device, a hardware abstraction layer for a particular device, etc.). Computer-readable media 912 also includes gesture sensor APIs 916.

Gesture sensor APIs 916 provide programmatic access to a gesture sensor component, examples of which are provided herein. The programmatic access can range from high-level program access that obscures underlying details of how a function is implemented, to low-level programmatic access that enables access to hardware. In some cases, gesture sensor APIs can be used to send input configuration parameters associated with modifying how signals are transmitted, received, and/or processed by a gesture sensor component.

System 900 also includes audio and/or video processing system 918 that processes audio data and/or passes through the audio and video data to audio system 920 and/or to display system 922 (e.g., a screen of a smart phone or camera). Audio system 920 and/or display system 922 may include any devices that process, display, and/or otherwise render audio, video, display, and/or image data. Display data and audio signals can be communicated to an audio component and/or to a display component via an RF link, S-video link, HDMI, composite video link, component video link, DVI, analog audio connection, or other similar communication link, such as media data port 924. In some implementations, audio system 920 and/or display system 922 are external components to system 900. Alternatively or additionally, display system 922 can be an integrated component of the example electronic device, such as part of an integrated touch interface.

System 900 also includes gesture sensor component 926 that wirelessly identifies one or more features of a target object, such as a micro-gesture performed by a hand as further described herein. Gesture sensor component 926 can be implemented as any suitable combination of hardware, software, firmware, and so forth. In some embodiments, gesture sensor component 926 is implemented as an SoC. Among other things, gesture sensor component 926 includes radar-emitting element 928, antennas 930, digital signal processing component 932, machine-learning component 934, and gesture library 936.

Radar-emitting element 928 is configured to provide a radar field. In some cases, the radar field is configured to at least partially reflect off a target object. The radar field can also be configured to penetrate fabric or other obstructions and reflect from human tissue. These fabrics or obstructions can include wood, glass, plastic, cotton, wool, nylon and similar fibers, and so forth, while reflecting from human tissues, such as a person's hand. Radar-emitting element 928 works in concert with antennas 930 to provide the radar field.

Antenna(s) 930 transmit and receive RF signals under the control of gesture sensor component 926. Each respective antenna of antennas 930 can correspond to a respective transceiver path internal to gesture sensor component 926 that physical routes and manages outgoing signals for transmission and the incoming signals for capture and analysis as further described herein.

Digital signal processing component 932 digitally processes RF signals received via antennas 930 to extract information about the target object. This can be high-level information that identifies a target object, or lower level information that identifies a particular micro-gesture performed by a hand. In some embodiments, digital signal processing component 932 additionally configures outgoing RF signals for transmission on antennas 930. Some of the information extracted by digital signal processing component 932 is used by machine-learning component 934. Digital signal processing component 932 at times includes multiple digital signal processing algorithms that can be selected or deselected for an analysis, examples of which are provided herein. Thus, digital signal processing component 932 can generate key information from RF signals that can be used to determine what gesture might be occurring at any given moment. At times, an application, such as gesture training application 914, can configure the operating behavior of digital signal processing component 932 via gesture Sensor APIs 916.

Machine-learning component 934 receives input data, such as a transformed raw signal or high-level information about a target object, and analyzes the input date to identify or classify various features extractable from the data, such as position data, motion data, presence data, shape data, and so forth. As in the case of digital signal processing component 932, machine-learning component 934 can include multiple machine-learning algorithms that can be selected or deselected for an analysis. Among other things, machine-learning component 934 can use the key information generated by digital signal processing component 932 to detect relationships and/or correlations between the generated key information and previously learned gestures to probabilistically decide which gesture is being performed. At times, an application, such as gesture training application 914, can configure the operating behavior of machine-learning component 934 via gesture Sensor APIs 916.

Gesture library 936 represents data used by gesture sensor component 926 to identify a target object and/or gestures performed by the target object. For instance, gesture library 936 can store signal characteristics, or characteristics about a target object that are discernable from a signal, that can be used to identify a unique in-the-air gesture, a user identity, user presence, and so forth. In some embodiments, gesture library 936 stores a machine-learning model dynamically generated when learning a new or unknown gesture. In addition, certain data stored in gesture library 936 may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

CONCLUSION

Various embodiments dynamically learn user-customizable input gestures. A user can transition a radar-based gesture detection system into a gesture-learning mode. In turn, the radar-based gesture detection system emits a radar field configured to detect a gesture new to the radar-based gesture detection system. The radar-based gesture detection system receives incoming radio frequency (RF) signals generated by the outgoing RF signal reflecting off the gesture, and analyzes the incoming RF signals to learn one or more identifying characteristics about the gesture. Upon learning the identifying characteristics, the radar-based gesture detection system reconfigures a corresponding input identification system to detect the gesture when the one or more identifying characteristics are next identified, and transitions out of the gesture-learning mode.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A radar-based gesture detection component implemented at least partially in hardware and configured to dynamically learn an in-the-air gesture, the radar-based gesture detection component comprising:
   a radar emitter;
   an antenna; and
   a machine-learning component configured to operate in concert with the radar emitter and the antenna to enable the radar-based gesture detection component to:
      initiate transmission of a radar field via the radar emitter, the radar field configured to capture information about an in-the-air gesture unknown to the radar-based gesture detection component by:
         configuring the radar emitter to emit the radar field with a first configuration for a first iteration of analysis used to determine one or more identifying characteristics about the in-the-air gesture by selecting, as the first configuration, a first radar field configuration comprising a first field size and directed to location detection of the in-the-air gesture; and
         reconfiguring the radar emitter to emit the radar field with a second configuration that is different from the first configuration for a second iteration of analysis used to determine the one or more identifying characteristics about the in-the-air gesture by selecting, as the second configuration, a second radar field configuration comprising a second field size that is different from the first field size and directed to micro-gesture detection of the in-the-air gesture;
      receive, via the antenna, an incoming radio frequency (RF) signal generated by the radar field reflecting off the in-the-air gesture being performed in the radar field;
      analyze, using at least the first iteration of analysis and the second iteration of analysis, the incoming RF signal to determine the one or more identifying characteristics about the in-the-air gesture; and
      reconfigure the machine-learning component to detect the in-the-air gesture based on the one or more identifying characteristics such that the machine-learning component can later determine a subsequent instance of the in-the-air gesture responsive to identifying the one or more identifying characteristics about the in-the-air gesture from a subsequently received incoming RF signal.

2. The radar-based gesture detection component as recited in claim 1, wherein the machine-learning component is further configured to:
   receive a command via a programmatic interface into the radar-based gesture detection component; and
   dynamically select, based on the command, at least one machine-learning algorithm used to analyze the incoming RF signal.

3. The radar-based gesture detection component as recited in claim 1, further comprising:
   a digital signal processing component configured to work in concert with the radar emitter, the antenna, and the machine-learning component to enable the radar-based gesture detection component to analyze the incoming RF signal, the digital signal processing component configured to:
      receive a command via a programmatic interface into the radar-based gesture detection component;
      dynamically select, based on the command, at least one signal processing algorithm used to extract information from the incoming RF signal; and
      input the information to the machine-learning component to determine the one or more identifying characteristics.

4. The radar-based gesture detection component as recited in claim 1, wherein the machine-learning component is further configured to:
   generate a new machine-learning model based upon the one or more identifying characteristics about the in-the-air gesture; and
   reconfigure the radar-based gesture detection component by storing the new machine-learning model in a library used to detect known gestures.

5. The radar-based gesture detection component as recited in claim 1 further configured to:
   receive a command via a programmatic interface to transition into a gesture-learning mode; and
   automatically complete the initiating, the receiving, the analyzing, and reconfiguring to detect the in-the-air gesture without further input via the programmatic interface.

6. The radar-based gesture detection component as recited in claim 1, wherein the radar-based gesture detection component is a System-on-Chip (SoC).

7. The radar-based gesture detection component as recited in claim 1, wherein the identifying characteristics about the in-the-air gesture that is unknown to the radar-based gesture detection component comprise a size, a shape, a movement speed, a movement direction, a surface smoothness, or a material composition of an object performing the in-the-air gesture.

8. The radar-based gesture detection component as recited in claim 1, wherein the identifying characteristics about the in-the-air gesture that is unknown to the radar-based gesture detection component comprise a biometric identifier for a user such that the user can be identified from other users.

9. The radar-based gesture detection component as recited in claim 8, wherein the biometric identifier comprises a ratio of sizes, cartilage structure, or bone structure for a user or a portion of the user.

10. A method for dynamically generating a machine-learning model for an unknown gesture, the method comprising:
   transitioning a radar-based gesture detection system into a gesture-learning mode;
   initiating, via a radar emitter of the radar-based gesture detection system, transmission of a radar field using at least one single-purpose antenna of the radar-based gesture detection system that is configured for transmission, the initiating comprising:
      initiating transmission of the radar field with a first configuration for a first iteration of analysis used to determine one or more identifying characteristics about a gesture that is undefined to the radar-based gesture detection system by selecting, as the first configuration, a first radar field configuration comprising a first field size for location detection of the gesture; and
      reconfiguring the radar emitter to emit the radar field with a second configuration for a second iteration of analysis used to determine the one or more identifying characteristics by selecting, as the second configuration, a second radar field configuration comprising a second field size that is different from the first field size for micro-gesture detection of the gesture;
   receiving, using at least one single-purpose antenna of the radar-based gesture detection system that is configured for reception, a first incoming radio frequency (RF) signal generated by at least a first portion of the radar field with the first configuration and a subsequent, second incoming RF signal generated by at least a second portion of the radar field with the second configuration, reflecting off the gesture;
   generating, using at least one digital signal processing component of the radar-based gesture detection system, a first digital capture of the first incoming RF signal and a second digital capture of the second incoming RF signal;
   analyzing the first digital capture in the first iteration of analysis and the second digital capture in the second iteration of analysis to learn the one or more identifying characteristics of the gesture;
   reconfiguring the radar-based gesture detection system to detect a subsequent instance of the gesture responsive to identifying the one or more identifying characteristics of the gesture from a subsequently received incoming RF signal; and
   transitioning the radar-based gesture detection system out of the gesture-learning mode.

11. The method as recited in claim 10, the reconfiguring further comprising:
   generating a new machine-learning model based upon the one or more identifying characteristics of the gesture; and
   storing the new machine-learning model in the radar-based gesture detection system.

12. The method as recited in claim 10, wherein the analyzing the first digital capture or the second digital capture comprises dynamically selecting, based on the first digital capture or the second digital capture, an algorithm used to analyze the first digital capture or the second digital capture.

13. The method as recited in claim 10, wherein initiating transmission of the radar field further comprises transmitting a near field configured to detect micro-gestures.

14. The method as recited in claim 10, wherein the identifying characteristics about the gesture comprise a size, a shape, a movement speed, a movement direction, a surface smoothness, a material composition, human-tissue reflection, cartilage structure, or bone structure of a user or a portion of the user.

15. A system for dynamically learning a gesture unknown to the system, the system comprising:
   a processing system;
   a gesture training application maintained in non-transitory computer-readable storage media and comprising processor-executable instructions executable by the processing system to perform a plurality of operations; and
   a radar-based gesture detection component implemented at least partially in hardware, and having a programmatic interface to enable communication with the gesture training application, the radar-based gesture detection component comprising:
      a radar emitter;
      an antenna; and
      a machine-learning component configured to operate in concert with the radar emitter and the antenna to enable the radar-based gesture detection component to:
      initiate transmission of a radar field via the radar emitter, the radar field configured to capture information about an in-the-air gesture unknown to the radar-based gesture detection component by:
         configuring the radar emitter to emit the radar field with a first configuration for a first iteration of analysis used to determine one or more identifying characteristics about the in-the-air gesture by selecting, as the first configuration, a first radar field configuration comprising a first field size for location detection of the in-the-air gesture; and
         reconfiguring the radar emitter to emit the radar field with a second configuration that is different from the first configuration for a second iteration of analysis used to determine the one or more identifying characteristics about the in-the-air gesture by selecting, as the second configuration, a second radar field configuration comprising a second field size that is different from the first field size for micro-gesture detection of the in-the air gesture;
      receive, via the antenna, a first incoming radio frequency (RF) signal generated by at least a first portion of the radar field with the first configuration and a second incoming RF signal generated by at least a second portion of the radar field with the second configuration reflecting off the in-the-air gesture;

analyze the first incoming RF signal in the first iteration of analysis and the second incoming RF signal in the second iteration of analysis to determine the one or more identifying characteristics about the in-the-air gesture; and reconfigure the machine-learning component to detect a subsequent instance of the in-the-air gesture responsive to identifying the one or more identifying characteristics about the in-the-air gesture from a subsequently received incoming RF signal.

16. The system as recited in claim 15, the gesture training application comprising processor-executable instructions configured to:

display instructions associated with training the radar-based gesture detection component to identify gestures unknown to the radar-based gesture detection component;

receive input to initiate a gesture learning process;

communicate with the radar-based gesture detection component via the programmatic interface to initiate the gesture learning process; and dynamically reconfigure the radar-based gesture detection component via the programmatic interface as part of the gesture learning process.

17. The system as recited in claim 15, wherein:

the radar-based gesture detection component further comprises at least one digital signal processing component; and the gesture training application comprises processor-executable instructions configured to:

communicate with the radar-based gesture detection component via the programmatic interface to dynamically select an algorithm used by the at least one digital signal processing component to analyze the first incoming RF signal or the second incoming RF signal; or communicate with the radar-based gesture detection component via the programmatic interface to dynamically select an algorithm used by the machine-learning component to analyze the first incoming RF signal or the second incoming RF signal.

18. The system as recited in claim 15, wherein the gesture training application comprises processor-executable instructions configured to:

display a first visual prompt that indicates when to perform the in-the-air gesture;

display a second visual prompt that indicates an update of a gesture training process; or display a third visual prompt that indicates how to assign the in-the-air gesture to a function.

19. The system as recited in claim 15, further comprising processor-executable instructions maintained in computer-readable storage media and executable by the processing system to assign the in-the-air gesture to a password.

20. The system as recited in claim 15 further comprising gesture sensor application programming interfaces (APIs) maintained in computer-readable storage media and executable by the processing system to enable the gesture training application to communicate with the radar-based gesture detection component via the programmatic interface.

21. The system as recited in claim 15, wherein the radar-based gesture detection component is configured to:

receive the subsequently received incoming RF signal, the subsequently received incoming RF signal received after the reconfiguring of the machine-learning component;

identify the one or more identifying characteristics about the in-the-air gesture from the subsequently received incoming RF signal; and detect the subsequent instance of the in-the-air gesture based on the identification of the one or more identifying characteristics about the in-the-air gesture from the subsequently received incoming RF signal.

* * * * *